United States Patent [19]
Kato et al.

[11] Patent Number: 5,754,280
[45] Date of Patent: May 19, 1998

[54] TWO-DIMENSIONAL RANGEFINDING SENSOR

[75] Inventors: Masahiko Kato, Akiruno; Hiroshi Matsuzaki, Hachioji; Tadashi Morokuma, Tokyo; Tsutomu Nakamura, Nagano-ken; Kazuya Matsumoto, Nagano-ken; Tetsuo Nomoto, Nagano-ken; Toyokazu Mizoguchi, Nagano-ken, all of Japan

[73] Assignee: Olympus Optical Co., Ltd., Tokyo, Japan

[21] Appl. No.: 651,679

[22] Filed: May 21, 1996

[30] Foreign Application Priority Data

May 23, 1995 [JP] Japan ................................. 7-146949

[51] Int. Cl.⁶ .................................................. G01C 3/08
[52] U.S. Cl. ................................... 356/3.06; 356/5.1
[58] Field of Search ........................... 356/5.1, 5.15, 356/3.06, 3.07, 3.14; 250/206.1

[56] References Cited

U.S. PATENT DOCUMENTS 4,935,616  6/1990  Scott ........................... 250/213 VT
5,579,103  11/1996  Tachikawa ..................... 356/5.1

*Primary Examiner*—Mark Hellner
*Attorney, Agent, or Firm*—Armstrong,Westerman, Hattori, McLeland & Naughton

[57] ABSTRACT

A two-dimensional rangefinding sensor of the present invention consisting of an illuminating device for projecting light beams, which undergoes luminance modulation at a predetermined frequency for a predetermined duration with a predetermined cycle time, onto an object, an image-formation optical system for forming an image of the object illuminated with light beams which have undergone the luminance modulation and which have been projected from the illuminating device, a two-dimensional image sensor mounted on an image-formation plane of the image-formation optical system, a driving means for performing a modulation driving operation on an electrode terminal, which is operative to determine the sensitivity of the two-dimensional image sensor at the frequency, and a reading means for reading a signal corresponding to a signal charge generated in each of picture elements of the image sensors. Thereby, a range-data image of a three-dimensional object can be obtained by using a two-dimensional image sensor without mechanically scanning with illumination light.

9 Claims, 27 Drawing Sheets

TWO-DIMENSIONAL RANGEFINDING SENSOR

BACKGROUND OF THE INVENTION

1. Field of the Invention

The present invention generally relates to a two-dimensional rangefinding sensor using a two-dimensional image sensor for extracting a "range image" of a three-dimensional object together with a "luminance image" thereof. More particularly, the present invention relates to a two-dimensional rangefinding sensor using a two-dimensional image sensor that can be utilized as "eyes" of mobile units such as a vehicle and a robot, which are used during the mobile units autonomously run on a celestial body and on the ground, or utilized as a device for inputting a static range-data image of a three-dimensional object.

2. Description of the Related Art

Hitherto, various methods, for example, (1) what is called a stereo-matching method and (2) what is called a slit(-light) projection method (namely, a silicon rangefinder method) and other methods have been known as methods for obtaining range images of three-dimensional objects by utilizing area sensors. In the case of the stereo-matching method, a range image is obtained by performing a correlation operation on a plurality of luminance images which have been obtained by picking up an object from a plurality of directions of visual lines (or lines of sight), respectively. This method is disclosed in "Handbook of Image Input Techniques" (edited by Yuji Kiuchi and published by the Nikkan Kogyo in 1992). Next, this stereo-matching method will be further described by referring to FIGS. 1A and 1B that illustrate the principle of a "binocular stereo vision method", by which output signals of two television cameras provided in such a manner as to be set away from each other are analyzed and thus information concerning the distance therefrom to an object. In FIG. 1A, reference numeral 1001 designates an object; 1002 and 1003 television cameras; and 1004 a signal processing system. FIG. 1B illustrates an enlarged view of a circled portion in FIG. 1A together with a coordinate system. If the object 1001 is at infinity, in each of the television cameras, an image point corresponding to a same point on the object 1001 coincides with what is called a "camera center", namely, a point of intersection of the photosensitive surface and the optical axis of a camera lens. Generally, in the case of a stereoscopic image, the object 1001 is not at infinity, so that the image point deviates from such a "camera center". Thus, if deviation distances a and b are known, the position or location P(x, y) of an object is obtained by the following equations (1) and (2):

$$x = a \cdot d/(a+b) \quad (1)$$

$$y = d \cdot c/(a+b) \quad (2)$$

where c designates the distance between the lens surface and the photosensitive surface; and d the distance between the camera centers of the television cameras. Generally, television cameras using charge coupled devices (CCDs) are used as input devices. Although this method should be applied to all cases in principle under appropriate illumination conditions, extremely high computational complexity is necessary for extracting from stereoscopic-image signals by performing a signal processing thereon. Moreover, in such a case, the calculation accuracy is not sufficiently high.

Meanwhile, in the case of the slit projection method, as shown in FIG. 2, by irradiating the object 1101 with stripe light 1105, which is obtained from laser light emitted by a laser 1102 through a cylindrical lens 1103 and a mirror 1104, and further forming a projection slit image modified correspondingly to the three-dimensional structure of the object 1101 on what is called a two-dimensional image sensor 1106. Incidentally, in FIG. 2, reference numeral 1107 denotes a base line. However, in the case of using this technique, it is necessary for inputting three-dimensional information into the two-dimensional image sensor to scan the position of the projection slit by means of the mirror 1104 and to take out the information from the two-dimensional image sensor 1106 at each scan. Therefore, in order to realize the 256-pixel spatial resolution (or resolving power) in the scanning direction of the projection stripe light, the information should be captured (or read) 256 times from the two-dimensional image sensor 1106. When the frame rate of the two-dimensional image sensor 1106 is 1/30 seconds, it takes about 8.5 seconds to read the information from the two-dimensional image sensor 1106.

Meantime, Kanade et al. of Carnegie Mellon University have proposed a method that uses an image sensor, which employs a circuit configuration designed specifically for rangefinding, instead of the aforementioned two-dimensional image sensor, whereby information corresponding to a full scan of the two-dimensional image sensor can be read only one time. This method, however, requires scanning with the projection stripe light similarly as the method described by referring to FIG. 2, in spite of the restriction that the special image sensor should be used. Incidentally, the slit projection method of FIG. 2 is described in detail in, for example, the article "Integrated Sensor and Range-Finding Analog Signal Processing", A. Gruss et al, IEEE J. Solid-State Circuits, Vol. 26, No. 3, March 1991, pp. 184–191.

The aforesaid conventional stereo-matching method requires performing operations and signal processing on enormous amounts of data and signals, respectively. In contrast, in the case of the slit projection method, there has been caused a problem that even in the case where the two-dimensional image sensor itself has the ability or capability of directly capturing a range image, some mechanical scanning portion is required, similarly as in the case of mechanically scanning the object with the stripe light. In view of reducing the size and weight of a sensor and increasing the operating speed thereof and realizing a maintenance-free sensor, it is preferable that the sensor is not provided with such a moving part. This is strongly demanded, for instance, in the case where the sensor is used in outer space.

The present invention is accomplished to resolve the problems concerning the conventional methods for obtaining a range image of a three-dimensional object by utilizing conventional area sensors.

SUMMARY OF THE INVENTION

It is, accordingly, a primary object of the present invention to provide a two-dimensional rangefinding sensor that can directly obtain a range image of an object without mechanical scan using illumination light.

To achieve the foregoing object, in accordance with the present invention, there is provided a two-dimensional rangefinding sensor of the present invention which comprises: an illuminating device for projecting light beams, which undergoes luminance modulation (namely, brilliance modulation or intensity modulation) at a predetermined frequency for predetermined duration with a predetermined cycle (or repetition) time, onto an object; an image-formation optical system (namely, an imaging optical system) for forming an image of the object illuminated with light beams which have undergone the luminance modulation and have been projected from the illuminating device; a two-dimensional image sensor mounted on an image-formation plane of the image-formation optical system; a driving means for performing a modulation driving operation on an electrode terminal, which is operative to determine the sensitivity of the two-dimensional image sensor, at the frequency; and a reading means for extracting a signal corresponding to a signal charge generated in each of picture elements of the two-dimensional image sensor.

In the case of the two-dimensional rangefinding sensor of the present invention having the aforementioned configuration, a light beam undergoing luminance modulation performed at a predetermined frequency is emitted from the illuminating device. Subsequently, an image of the object illuminated with this light beam is formed on the two-dimensional image sensor through the image-formation optical system. At that time, in reflected illumination light received on each of the picture elements built in the two-dimensional image sensor, a phase shift corresponding to the three-dimensional structure of the object is caused. Thus, the sensor is constructed in such a manner that the light-sensing sensitivity of the two-dimensional image sensor can be modulated at the predetermined frequency. Thereby, in the case of a picture element at which the phase of the received illumination light matches the phase of the sensitivity of the two-dimensional image sensor, a large amount of signal charge is stored therein. In contrast, in the case of a picture element at which the phase of the received illumination light does not match the phase of the sensitivity of the two-dimensional image sensor, only a small amount of signal charge is stored therein. Therefore, two dimensional range information concerning the three-dimensional object is directly represented by taking out the signal charge stored in each of the picture elements of the two-dimensional image sensor by the reading means.

Further, it is another object of the present invention to achieve a two dimensional rangefinding operation with higher accuracy at a higher speed in the two-dimensional rangefinding sensor recited in the appended claim 1.

To attain this object of the present invention, in accordance with the present invention, there is provided another two-dimensional rangefinding sensor that employs a CMD (charge modulation device) image sensor as the two-dimensional image sensor and further uses the gate electrode or the substrate electrode of the CMD image sensor as an electrode terminal for sensitivity modulation. Thereby, the sensitivity modulation can be achieved at a high frequency.

Moreover, it is a further object of the present invention to achieve a sensitivity modulating operation at a further higher speed in the two-dimensional rangefinding sensor recited in the appended claim 2, which uses the CMD image sensor.

To attain this object of the present invention, in accordance with the present invention, there is provided still another two-dimensional rangefinding sensor, wherein a p-channel layer and an n-channel layer are formed on a p-type substrate of a CMD image sensor by performing an epitaxial growth method, wherein the resistivity of the substrate is lowered by setting the impurity concentration of the p-type substrate in such a way as to be higher than the impurity concentration of the p-channel layer. Alternatively, there is provided yet another two-dimensional rangefinding sensor, wherein the back surface portion of the substrate of a CMD image sensor is partly removed by performing a lapping method, thereby reducing the thickness of the substrate. Thus, the maximum modulation frequency of the CMD image sensor can be increased and the accuracy of the range information can be enhanced by lowering the resistivity of the substrate or by reducing the thickness of the substrate.

Furthermore, it is still another object of the present invention to enhance the operating accuracy of the two-dimensional rangefinding sensor recited in the appended claim 1 by realizing a long-time integration in the two-dimensional image sensor.

To attain this object of the present invention, in accordance with the present invention, there is provided still another two-dimensional rangefinding sensor, wherein a cooling unit is provided in the back surface portion of the two-dimensional image sensor with the intention of reducing a dark current. Thereby, the long-time integration can be achieved.

Additionally, it is yet another object of the present invention to change the configuration of the two-dimensional rangefinding sensor recited in the appended claim 1 in such a way as to be able to deal with a weak incidence signal.

To attain this object of the present invention, in accordance with the present invention, there is provided still another two-dimensional rangefinding sensor, wherein an electron-bombarded two-dimensional amplified MOS intelligent imager (AMI) image sensor is used as a two-dimensional image sensor. The electron-bombarded AMI image sensor has the high-sensitivity characteristics. Thus this two-dimensional rangefinding sensor can deal with a weak incidence signal.

Besides, it is another object of the present invention to change the configuration of the two-dimensional rangefinding sensor recited in the appended claim 1 in such a manner as to be able to obtain two-dimensional range information with little off-set and preferable signal-to-noise ratio (S/N).

To attain this object of the present invention, in accordance with the present invention, there is provided another two-dimensional rangefinding sensor, wherein a laminated two-dimensional AMI image sensor is used as a two-dimensional image sensor. In the case of using this laminated two-dimensional AMI image sensor, there can be obtained a signal with little off-set and preferable S/N.

In addition, it is still another object of the present invention to provide a two-dimensional rangefinding sensor which can simultaneously perform both of a modulation-mode image pickup and a luminance-mode image pickup in a single image pickup operation to thereby obtain two-dimensional range information in a short period of time.

To attain this object of the present invention, in accordance with the present invention, there is provided still another two-dimensional rangefinding sensor, which comprises first and second two-dimensional image sensors for receiving a light beam representing an image of an object, a beam splitter for splitting an image-formation light beam obtained through image-formation optical system into light beams to be respectively sent to the first and second two-dimensional image sensors, and a sensitivity modulation driving means for modulating the sensitivity of the first two-dimensional image sensor. Thus, both of a modulation-mode image pickup and a luminance-mode image pickup can be simultaneously performed in a single image pickup operation to thereby obtain two-dimensional range information in a short period of time.

Further, to attain this object of the present invention, in accordance with the present invention, there is provided yet another two-dimensional rangefinding sensor that comprises a single two-dimensional CMD image sensor in which picture elements, each of which is operative to perform an image pickup operation in an ordinary direct-current-component-mode-like luminance mode, and picture elements, each of which is operative to perform an image pickup operation in a modulation mode, are disposed in an intermixed manner. Thus, both of a modulation-mode image pickup and a luminance-mode image pickup can be simultaneously performed in a single image pickup operation to thereby obtain two-dimensional range information in a short period of time.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Figure 1A:
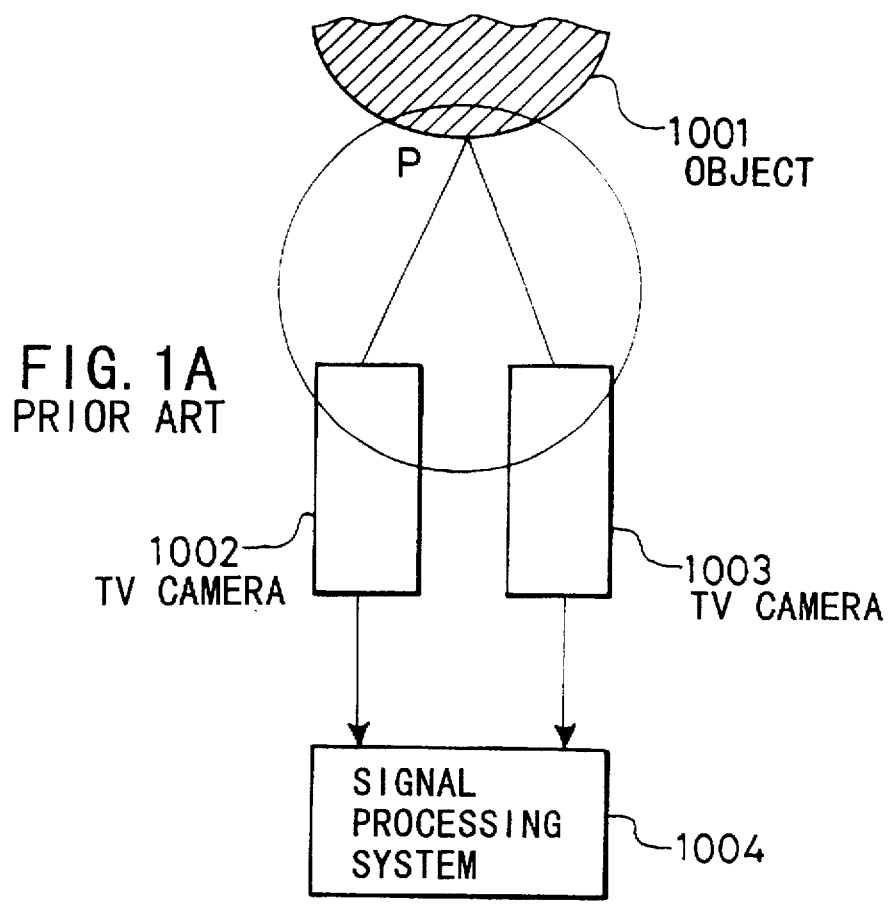
FIGS. 1A and 1B are diagrams for illustrating a conventional stereo-matching method by which obtains a range image of a three-dimensional object.
Figure 1B:
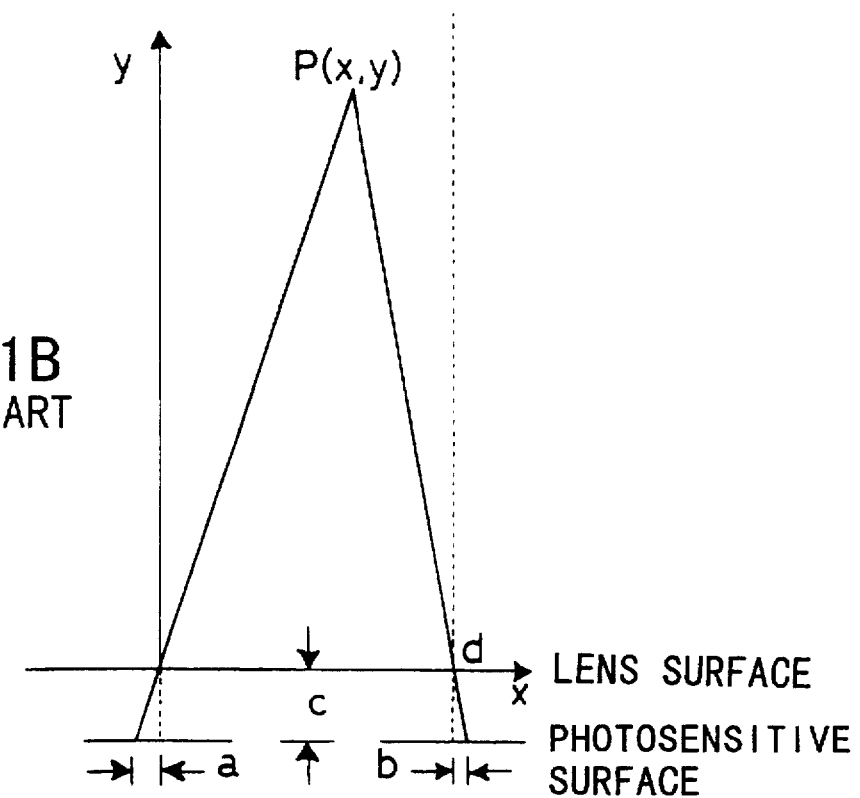
Figure 2:
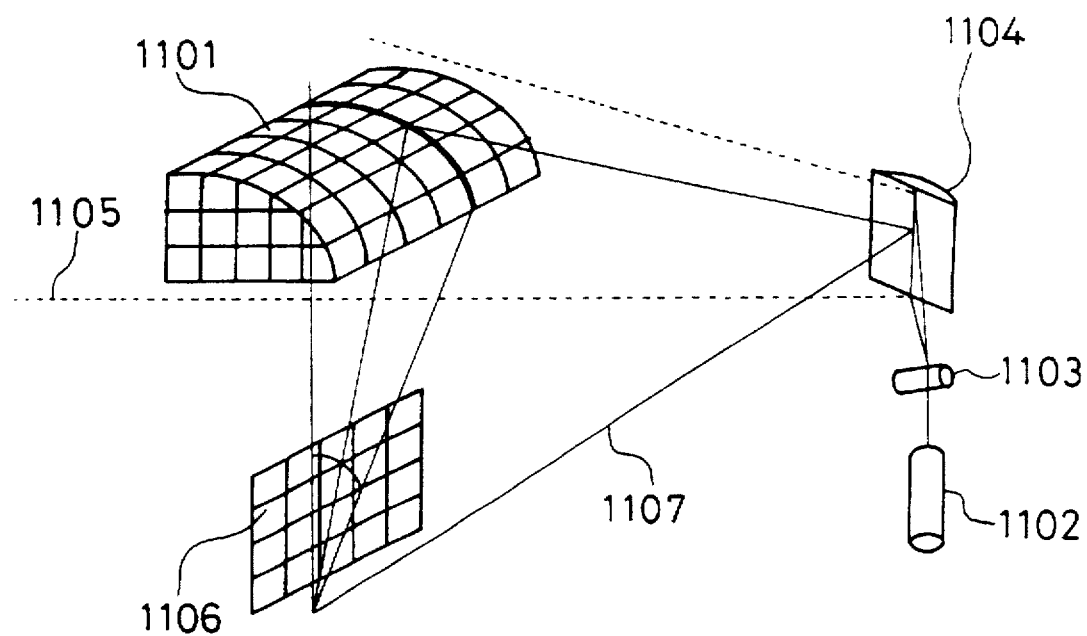
FIG. 2 is a diagram for illustrating a conventional slit projection method by which obtains a range image of a three-dimensional object.
Figure 3:
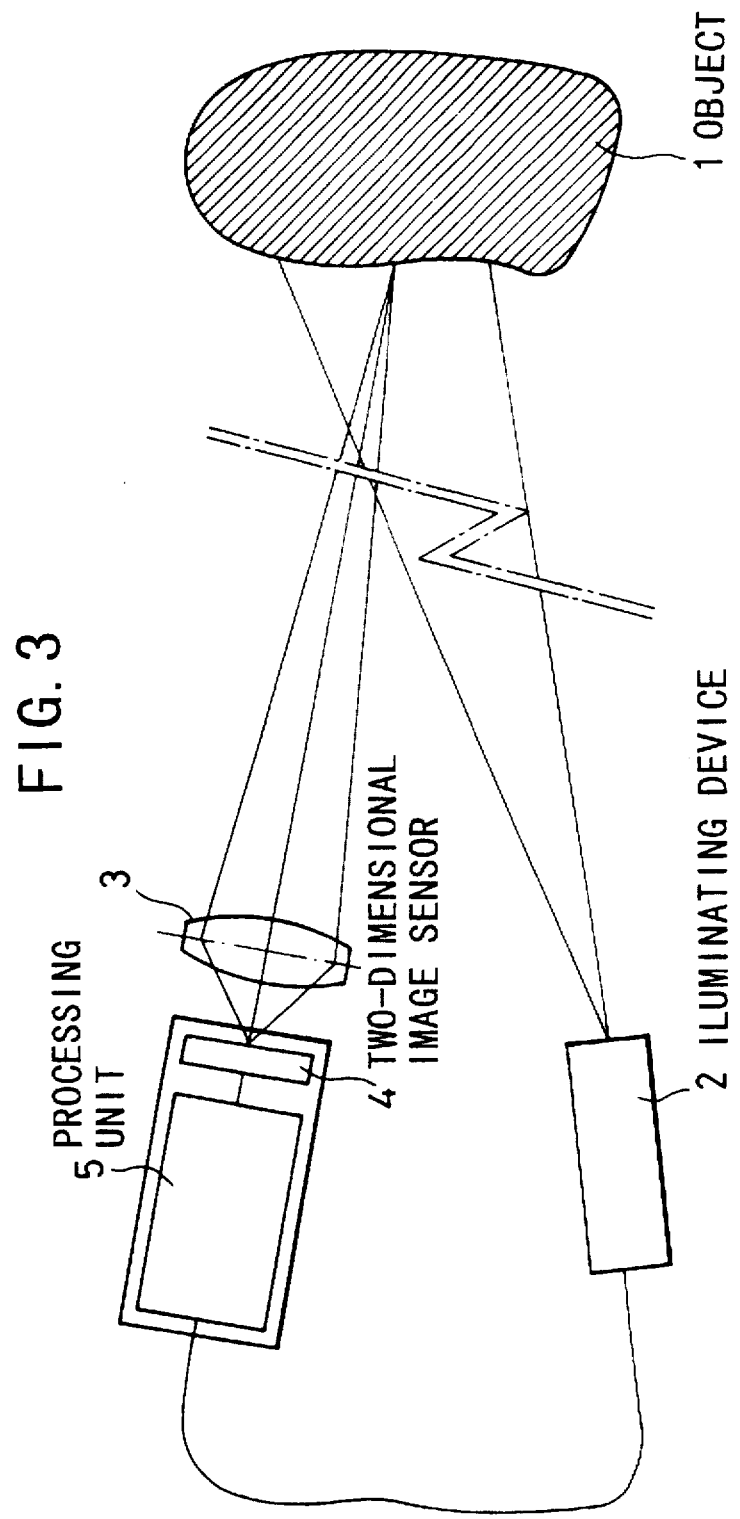
FIG. 3 is a diagram for illustrating the conceptually fundamental configuration of a two-dimensional rangefinding sensor of the present invention.

First, before describing practical preferred embodiments of the present invention, the fundamental configuration of a two-dimensional rangefinding sensor of the present invention will be described hereinbelow by referring to FIG. 3. The two-dimensional rangefinding sensor of the present invention consists of: an illuminating device 2 for projecting light beams, which undergoes luminance modulation (namely, brilliance modulation or intensity modulation) at a predetermined frequency for predetermined duration with a predetermined cycle (or repetition) time, onto an object 1 (to be illuminated); an image-formation optical system (namely, an imaging optical system) 3 for forming an image of the object 1 illuminated with light beams which have undergone the luminance modulation and have been projected from the illuminating device 2; a two-dimensional image sensor 4 mounted on an image-formation plane of the image-formation optical system 3; and a processing unit 5 that has a driving means for performing a modulation driving operation on an electrode terminal, which is operative to determine the sensitivity of the two-dimensional image sensor 4, at the frequency and further has a reading means for extracting a signal corresponding to a signal charge generated in each of picture elements of the two-dimensional image sensor 4.

In the case of the two-dimensional rangefinding sensor of the present invention having the aforementioned configuration, a light beam undergoing luminance modulation performed at a predetermined frequency is emitted from the illuminating device 2. Subsequently, an image of the object 1 illuminated with this light beam is formed on the two-dimensional image sensor 4 through the image-formation optical system 3. Then, the two-dimensional image sensor 4 is driven by the processing circuit 5. Thus information stored in the image sensor 4 is read out therefrom. At that time, in illumination light received on each of the picture elements built in the two-dimensional image sensor 4, a phase shift corresponding to the three-dimensional structure of the object 1 is caused. Thus, the sensor is constructed in such a manner that the light-sensing sensitivity of the two-dimensional image sensor 4 can be modulated at the predetermined frequency. Thereby, in the case of a picture element at which the phase of the received illumination light matches the phase of the sensitivity of the two-dimensional image sensor 4, a large amount of signal charge is stored therein. In contrast, in the case of a picture element at which the phase of the received illumination light does not match the phase of the sensitivity of the two-dimensional image sensor 4, only a small amount of signal charge is stored therein. In other words, the detection of the phase of the received illumination light is performed at each picture element. The amounts of electric charge respectively stored in the picture elements directly represents range information corresponding to the three-dimensional object.

The two-dimensional image sensor is provided with a photoelectric conversion portion that uses p-n photodiodes or metal-oxide-semiconductor (MOS) photodiodes, which are usually put into a reverse-bias condition, as picture elements. Therefore, the sensitivity modulation can be realized by modulating the bias conditions, which are established for this photoelectric conversion portion, in synchronization with the luminance-modulation frequency of the illuminating device 2. Thus, the object is irradiated with light beams which have undergone the luminance modulation and are emitted from the illuminating device 2. Then, a two-dimensional image is formed on the two-dimensional image sensor 4 from reflected light. Subsequently, the bias terminal established correspondingly to the photoelectric conversion portion of the two-dimensional image sensor 4 is modulated and driven in synchronization with the modulation frequency of the illuminating device 2. Thereby, the degree of the photoelectric conversion by the two-dimensional image sensor 4 is modulated. Consequently, what is called a phase detection can be achieved at each of the picture elements. Namely, the range information concerning the three-dimensional object can be obtained without a mechanical scanning portion as being represented by the amounts of electric charge stored in each of the picture elements of the two-dimensional image sensor. In other words, the range information can be obtained as being corresponding to a luminance image.

Figure 4:
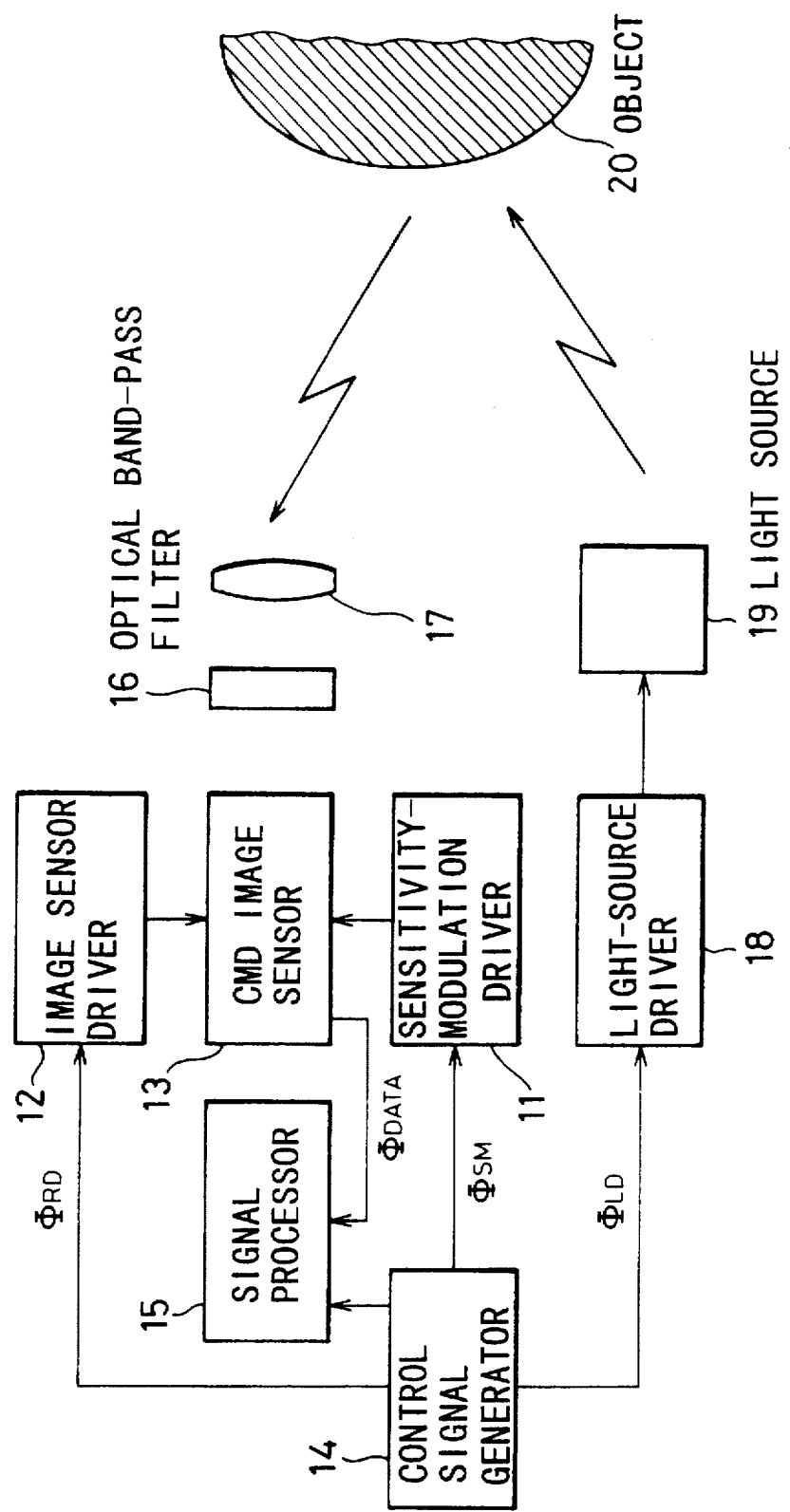
FIG. 4 is a block diagram for illustrating the configuration of a practical first two-dimensional rangefinding sensor embodying the present invention, namely, a first embodiment of the present invention.

Next, a practical embodiment will be described hereinafter. FIG. 4 is block diagram for illustrating the configuration of a two-dimensional rangefinding sensor embodying the present invention, namely, the first embodiment of the present invention. In this figure, reference numeral 11 designates a sensitivity modulation driver for modulating the sensitivity of the two-dimensional image sensor:; 12 a two-dimensional image sensor driver; 13 a two-dimensional image sensor; 14 a control signal generator; 15 a signal processor; 16 an optical band-pass filter which eliminates the influence of background light and allows only light, whose wavelength is close to the wavelength of reflected light of the wavelength band of a light source undergoing luminance modulation, to pass therethrough; 17 an image-formation optical system; 18 a light source driver; 19 a light source; and 20 an object.

Figure 5:
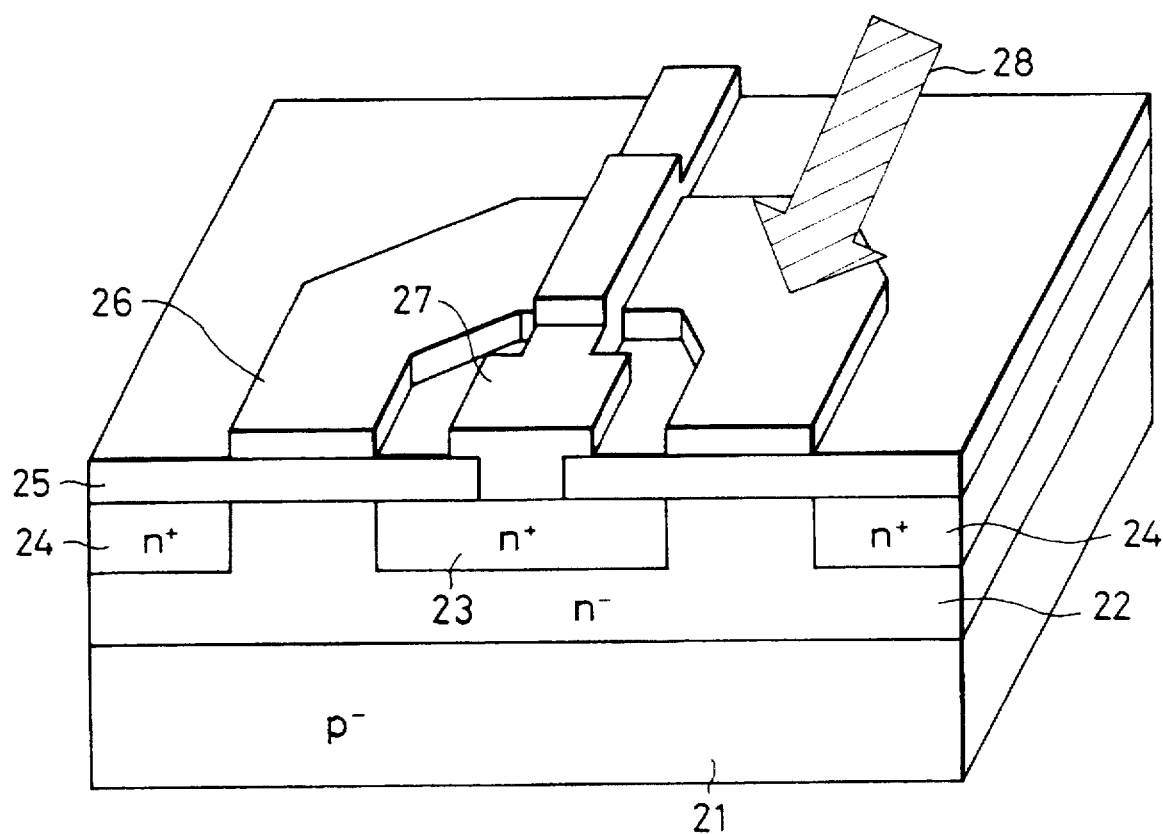
FIG. 5 is a diagram for illustrating the structure of a CMD, which composes a single picture element, of a two-dimensional CMD image sensor used in the first embodiment of FIG. 4.

In the case of this embodiment, a two-dimensional CMD image sensor using CMDs (namely, charge modulation devices) as picture elements is employed as the two-dimensional image sensor 13. FIG. 5 is a diagram for roughly illustrating the structure of a CMD, which composes a single picture element serving as a unit for receiving light, of a two-dimensional CMD image sensor. In this figure, reference numeral 21 designates a p⁻-substrate; 22 an n⁻-channel layer formed by performing an epitaxial growth method; 23 an n⁺ source diffusion layer; 24 an n⁺ drain diffusion layer; 25 a gate insulation film; 26 a gate electrode; and 27 a source electrode.

The CMD picture element having such a configuration operates as follows. Namely, signal light 28 having been incident thereon from an upper portion of the gate electrode 26 is transmitted by the gate electrode 26 and the gate insulation film 25 in sequence. Thus, hole-electron pairs are generated in the n⁻-channel layer 22. The generated holes are stored in the interface between the insulation film and a semiconductor under the gate electrode 26 to which a negative voltage is applied. Then, the potential barrier against electrons, which are present in a region between the drain diffusion layer 24 and the source diffusion layer 23, is lowered owing to the stored holes. As a result, a source-drain current modulated by the stored hole flows therethrough. Consequently, a signal current depending on the quantity of incident light can be obtained non-destructively.

Next, an operation of the first embodiment of FIG. 4 using the two-dimensional CMD image sensor of such a configuration will be described hereinbelow by referring to a timing chart of FIG. 6. In this figure, $\Phi_S$ denotes a measurement starting pulse; $\Phi_{SM}$ a waveform of a control signal used for modulating the sensitivity of the CMD image sensor 13; $\Phi_{LD}$ a waveform of a control signal used for driving the light source 19; $\Phi_{ref}$ a waveform of return light that is emitted from the light source 19 and is thereafter reflected by the object 20, which is at a finite distance therefrom, and forms an image on the light receiving surface of the CMD ; $\Phi_{RD}$ a group of driving pulses for reading data from the CMD image sensor 13; and $\Phi_{DATA}$ a waveform of a signal representing read data.

Figure 6:
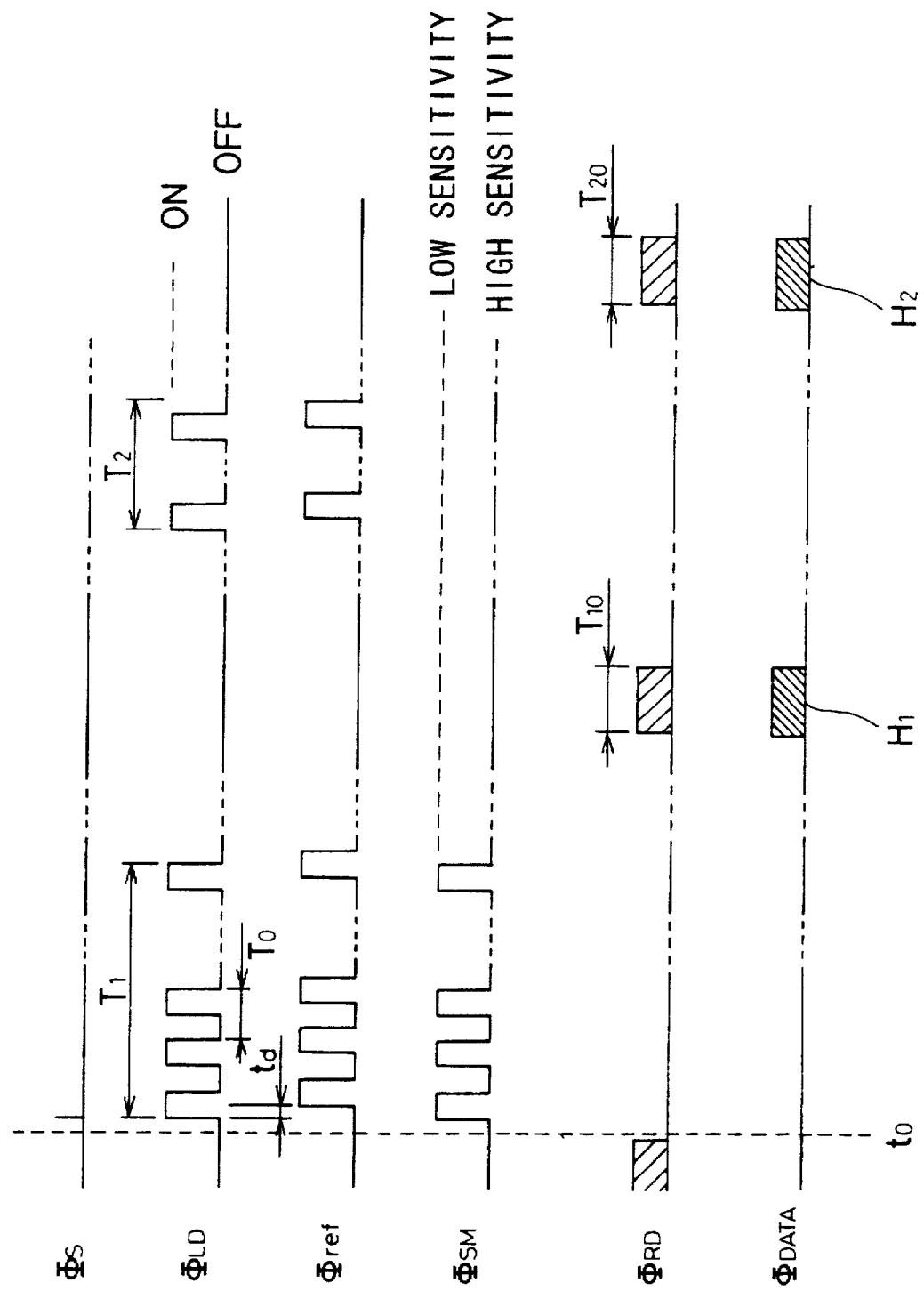
FIG. 6 is a timing chart for illustrating an operation of the first embodiment of the present invention of FIG.4.
Figure 7:
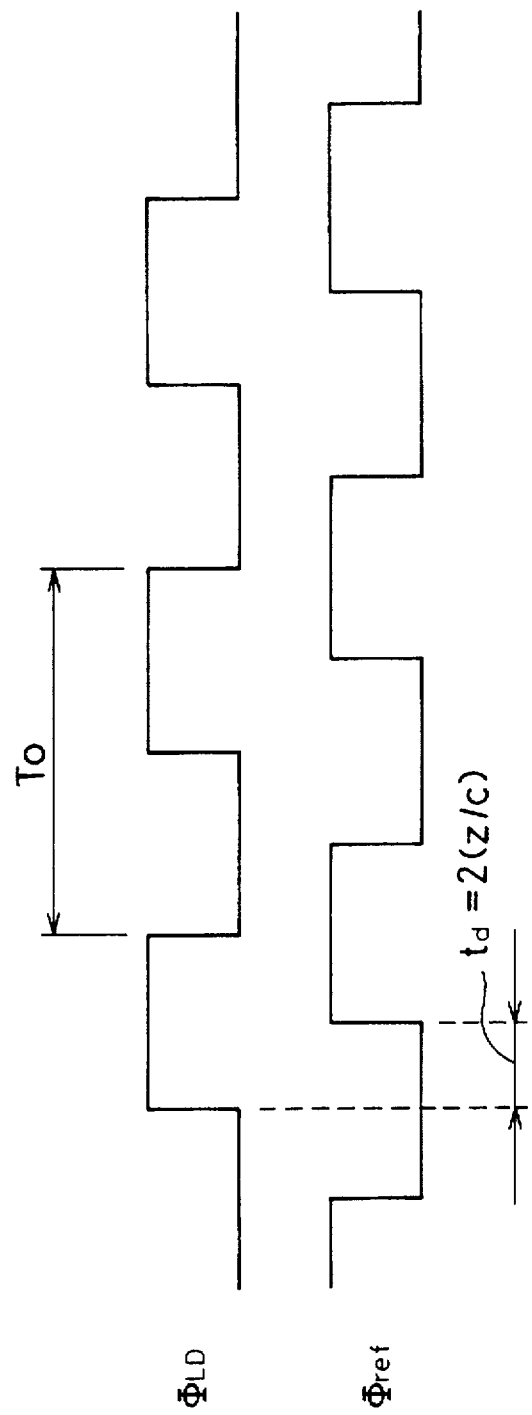
FIG. 7 is an enlarged view of a part of the timing chart of FIG. 6.

At a point of time to shown in FIG. 6, all signal charges have been preliminarily discharged from the CMD image sensor 13. On the other hand, the light source 19 is turned off. Subsequently, when a measurement starting pulse $\Phi_S$ is outputted, the light source driver 18 starts the luminance modulation of the light source 19 in response to a control signal $\Phi_{LD}$ issued from the control signal generator 14 (see the term (namely, the time period) $T_1$ of FIG. 6). Moreover, in this time period, the sensitivity modulation driver 11 for the modulation of the sensitivity of the CMD image sensor 13 commences performing such sensitivity modulation at a same frequency as in the case of the luminance modulation, in response to a control signal $\Phi_{SM}$ issued from the control signal generator 14. Here, for simplicity of description, it is assumed that the luminance modulation and the sensitivity modulation are conducted in a period $T_0$ by using rectangular waves whose duty ratio is 50%, that the lowest level of the modulated luminance is set at a level 0 of the luminance and that the lowest level of the modulated sensitivity is set at a level 0 of the sensitivity. Considering the case that the object 20 is at a distance z from the sensor, light projected from the light source 19 travels the distance z. Then, the light is projected onto the object 20 and is further reflected thereon. Subsequently, the reflected light travels the distance z once more. Finally, an image is formed on the CMD image sensor 13 from this light. Thus, as shown in the enlarged timing chart of FIG. 7, there is a time lag $t_d$ which is given by the following equation (3), between the emission of the light from the light source 19 and the incidence of the light coming from the object 20, which is at the distance z away therefrom, onto the CMD image sensor 13:

$$t_d = 2 \cdot z/c \tag{3}$$

where c designates the velocity of light.

Therefore, the ratio of the number of signal charges, which can be generated in a picture element of the two-dimensional CMD image sensor 13 for one period (or cycle) of the luminance modulation term, to the number of signal charges, which can be generated therein for the same term in the case that the object is at the distance z=0 (namely, in this case, the ratio θ=1), is obtained by the following equation (4):

$$\eta = 1 - 2 \cdot t_d/T_0 \tag{4}$$

Namely, when an output of the picture element is measured, the value of the output thereof is proportional to the ratio θ. Moreover, as is understood from the equation (4), the time lag $t_d$ can be found from the known period $T_0$ and the measured ratio θ. Furthermore, the distance z therefrom to the object can be calculated by using the equation (3).

Thus, when the term $T_1$, expires, the signal charges given by the following equation (5) are stored in each of the picture elements of the CMD image sensor 13:

$$H_1(x,y) = k \cdot \eta(z) \cdot I(x,y) \cdot T_1 \tag{5}$$

where k designates a proportional constant; and I(x,y) the quantity of light reflected by the object. Incidentally, I(x,y) includes the influence of illuminance of the light source, which decreases in proportion to the distance therefrom to the object.

After the expiration of the term $T_1$, a pixel signal outputted from each of the picture elements is read by driving the CMD image sensor 13. Further, the read signal is stored in a memory (not shown) provided in the signal processor 15. Moreover, simultaneously with the reading of the signal, or upon completion of the reading thereof, the signal charges stored in each of the picture elements are cleared. Subsequently, the light source driver 18 starts the luminance modulation of the light source 19 again in response to a control signal $\Phi_{LD}$ sent from the control signal generator 14 (see the term $T_2$ of FIG. 6). On the other hand, the sensitivity modulation driver 11 maintains the sensitivity of the CMD image sensor 13 at a constant value or level. In this case, because of the fact that the modulation of the sensitivity of the CMD image sensor 13 is not performed differently from the case of the term $T_1$, the factor relating to the sensitivity modulation in the equation (5) becomes a constant. Thus, the signal charges given by the following equation (6) are stored in each of the picture elements of the CMD image sensor 13 when the term $T_2$ expires:

$$H_2(x,y) = (k/2) \cdot I(x,y) \cdot T_2 \tag{6}$$

After the expiration of the term $T_2$, each pixel signal is read by driving the CMD image sensor 13. Further, the read signals are stored in a memory (not shown) other than the aforementioned memory, to which the signals are written after the expiration of the term $T_1$, among memories (not shown) provided in the signal processor 15. These memories store the information represented by the equations (5) and (6). Thus, two-dimensional range information can be easily obtained from the following equation (7):

$$\eta(z) = (1/2) \cdot \{H_1(x,y)/T_1\}/\{H_2(x,y)/T_2\} \tag{7}$$

Namely, in the case of this embodiment, the luminance modulation is performed in a two-dimensional manner. Moreover, a light-receiving operation thereof is conducted on the two-dimensional image sensor. In accordance with the system of this embodiment of the present invention, the two-dimensional range information and the luminance information are obtained from continuous fields or frames. Although the exemplary sensor using the two-dimensional CMD image sensors has been described in the foregoing description of this embodiment, the gist of the system of this embodiment is that the sensitivity of the two-dimensional image sensor is modulated in synchronization with the frequency at which the luminance modulation is performed on the light source. Therefore, the two-dimensional image sensor to be utilized is not limited to the CMD image sensor. It is obvious that two-dimensional solid-state image sensors using CCDs, whose sensitivity depends on the substrate potential or the electrode potential thereof being present on the light receiving surface, or the like can be applied to, namely, employed in the sensor of this embodiment. Moreover, in the foregoing description of this embodiment, there has been disclosed the sensor adapted to perform the luminance modulation on the light source similarly as at the time of performing the sensitivity modulation, even in the case of exposing the image sensor without performing the sensitivity modulation.

However, needless to say, the luminance modulation may be omitted in the case of exposing the image sensor without performing the sensitivity modulation. The above is the description of the principles or essentials of the first embodiment of the present invention.

Next, a second embodiment of the present invention will be described hereinbelow. In the case of this embodiment, the sensitivity modulation is performed by using CMD image sensor disclosed in Japanese Patent Laid-Open No. 60-206063/1986 Official Gazette as the two-dimensional image sensor of the first embodiment of the present invention. As a result of employing such a CMD image sensor, the second embodiment of the present invention can achieve the sensitivity modulation at a higher frequency in comparison with the case of employing an ordinary image sensor that uses CCDs or the like. The second embodiment of the present invention, therefore, can accomplish a high-accuracy two-dimensional rangefinding operation.

Figure 8:
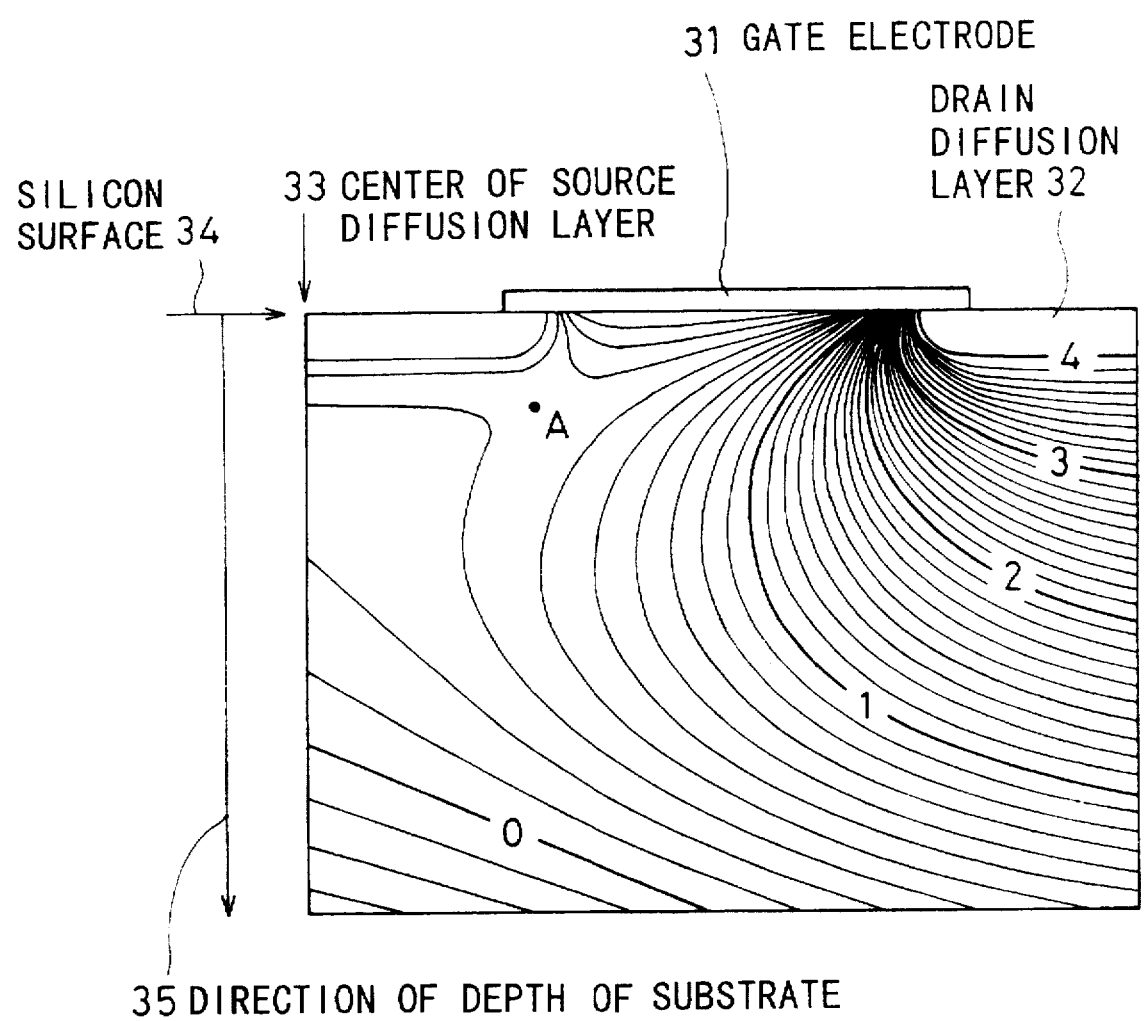
FIG. 8 is a diagram showing a manner or mode of the internal potential of a CMD for illustrating a second embodiment of the present invention.
Figure 9:
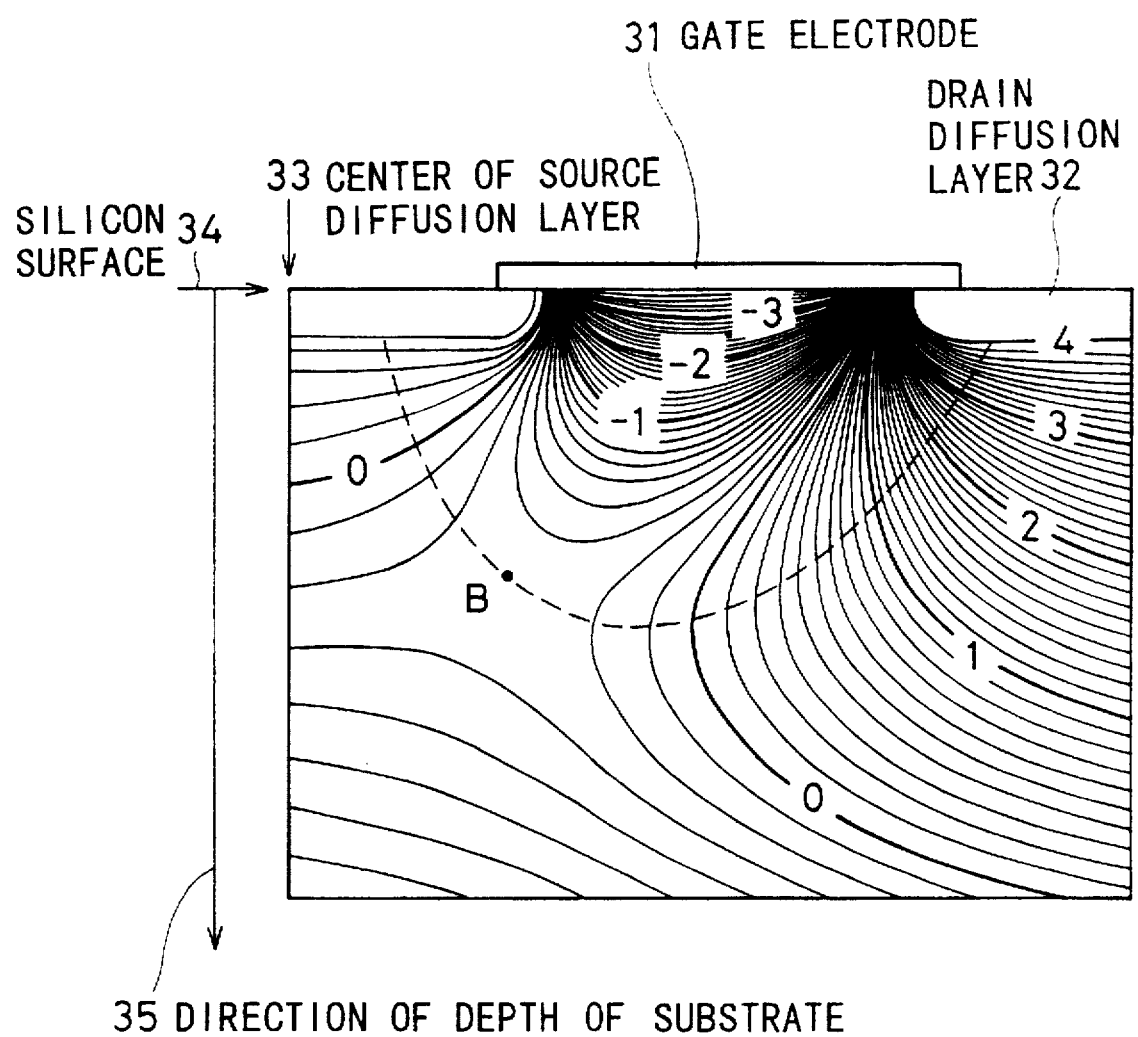
FIG. 9 is a diagram showing another manner of the internal potential of a CMD.
Figure 10:
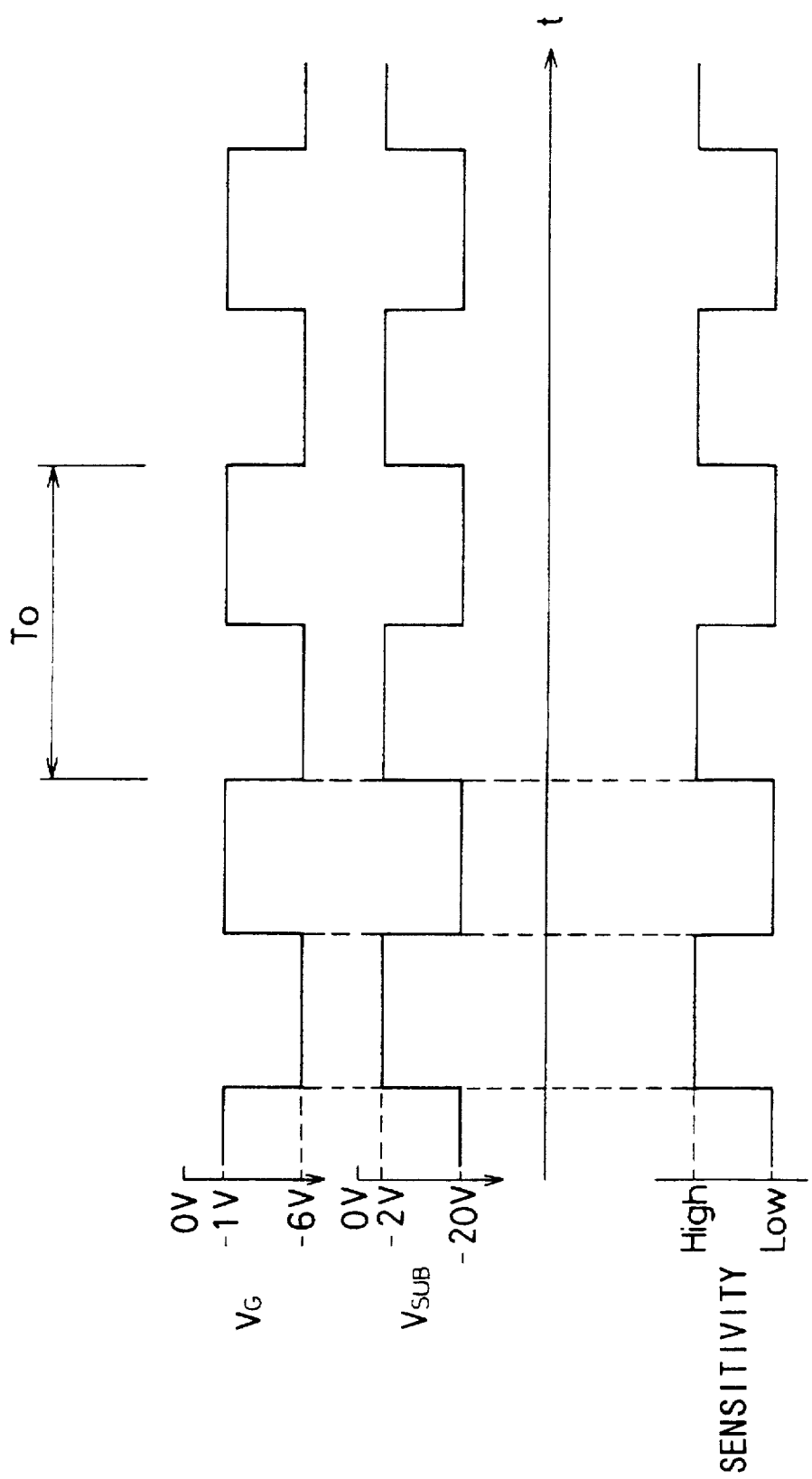
FIG. 10 is a timing chart for illustrating the manner of driving the gate and substrate of a CMD.

FIGS. 8 and 9 are diagrams respectively showing the internal potential distribution of the CMD image sensor in the case that the gate potential of CMDs composing the CMD image sensor is set at (−1) volt (V) and the internal potential distribution thereof in the case that the gate potential of the CMDs is set at (−6) V. Hereinafter, the principle of the method for modulating the light-sensing sensitivity of the CMD will be described by referring to these diagrams for showing the internal potential distributions of the CMD image sensor. Incidentally, in these figures, reference numeral 31 designates a gate electrode; 32 a drain diffusion layer; 33 the center of the source diffusion layer; and 34 a silicon surface; 35 the direction of the depth of a substrate. The hole of a hole-electron pair, which is generated between each of saddle points A and B of these figures and the gate electrode, travels according to the potential gradient in the substrate and is stored in a portion under the gate electrode. In other words, as a result of the behavior of the hole generated in a region between the saddle point A or B of potential and the gate electrode, the volume of a portion acting as a light receiving region is small in the case that $V_G$ of FIG. 8 is (−1) V. This is because the saddle point A of potential is close to the (silicon) surface. Thus, the ratio of the number of holes stored in the portion under the gate electrode to the number of all holes generated therein is small. In contrast, in the case of FIG. 9 in which $V_G$ is (−6) V, the saddle point B is formed in a deeper portion in comparison with the case that $V_G$ is (−1) V. Thus, the volume of a portion acting as a light receiving region, which is indicated by dashed curve, is large. Consequently, the ratio of the number of holes stored in the portion under the gate electrode to the number of all holes generated therein is large. Namely, if the gate potential $V_G$ is modulated between (−1) V and (−6) V while an image of the object is formed and the two-dimensional image sensor performs an image pickup operation, the light-sensing sensitivity is also modulated. Thereby, the two-dimensional rangefinding sensor as above described can be realized.

Meanwhile, there is a method for modulating the light-sensing sensitivity of the CMD image sensor other than the method of modulating the gate potential. For example, the light-sensing sensitivity can be modulated to a necessary extent by modulating the substrate potential $V_{SUB}$.

When $V_{SUB}$=−20 V, the potential distribution is similar to that of FIG. 8. In contrast, when $V_{SUB}$=−2 V, the potential distribution is similar to that of FIG. 9. Similarly as in the case of changing the gate potential, the internal potential gradient of the substrate changes according to the substrate voltage. Thus, when $V_{SUB}$=−20 V, the saddle point of potential is formed in a portion near to the surface. Consequently, the volume of a portion acting as a light receiving region is small. Moreover, the ratio of the number of holes stored in the portion under the gate electrode to the number of all holes generated therein is small. In contrast, in the case that $V_{SUB}$ is (−2) V, the saddle point is formed in a deeper portion in comparison with the case that $V_{SUB}$ is (−20) V. Thus, the volume of a portion acting as a light receiving region, is large. Consequently, the ratio of the number of holes stored in the portion under the gate electrode to the number of all holes generated therein is large. Namely, if the substrate potential $V_{SUB}$ is modulated between (−2) V and (−20) V while an image of the object is formed and the two-dimensional image sensor performs an image pickup operation, the light-sensing sensitivity is modulated, similarly as in the case of modulating the gate potential. Thereby, the two-dimensional rangefinding sensor as above described can be realized.

Further, another example of the method for performing the sensitivity modulation by using the CMD image sensor is the combination of the aforementioned gate-potential modulation and the aforesaid substrate-potential modulation. In the case of this method, the sensitivity modulation is achieved by performing a bias modulation between a high-sensitivity state, in which the gate potential $V_G$ is (−6) V and the substrate voltage $V_{SUB}$ is (−2) V, and a low-sensitivity state in which the gate potential $V_G$ is (−1) V and the substrate voltage $V_{SUB}$ is (−20) V. In accordance with this method, the mutually potentiating effects of the gate-potential modulation and the substrate-voltage modulation can be obtained. Thus, a high degree of the sensitivity modulation effects can be realized in comparison with the sensitivity modulation effects obtained in the case of performing the bias modulation of the gate potential and that of the substrate voltage individually. It is demonstrated by simulation and experiment conducted by the applicant of the present application that when incident light has a wavelength λ of 660 nanometers (nm), the bias modulation using the combination of $V_G$ (=−6 V/−1 V) and $V_{SUB}$ (=−2 V/−20 V) increases the sensitivity modulation effects about three-fold.

Next, the practical configuration of the entire two-dimensional CMD image sensor of such a type will be described with reference to the circuit diagram of FIG. 11. First, CMDs 41-11, 41-12, . . . , 41-mn, which respectively constitute picture elements, are placed in a matrix-like arrangement. Further, a video bias $V_D$ (>0) is applied in common to the drain of each of the CMDs. The gate terminals of the CMDs of the group disposed in X-direction are connected to row lines 42-1, 42-2, . . . , 42-m, respectively. Moreover, the source terminals of the CMDs of the group disposed in Y-direction are connected to column lines 43-1, 43-2, . . . , 43-n, respectively. The column lines 43-1, 43-2, . . . , 43-n are connected to a signal line 45 through column selecting transistors 44-1, 44-2, . . . , 44-n, respectively. The signal line 45 is connected to a pre-amplifier (not shown) of the current-voltage conversion type, whose input (terminal) is further virtually grounded. Moreover, video signals are read out at the output terminal of the pre-amplifier as a time series of signals. Moreover, the row lines 42-1, 42-2, . . . , 42-m are connected to a vertical scanning circuit 46. Furthermore, signals $\Phi_{G1}$, $\Phi_{G2}$, . . . , $\Phi_{Gm}$ are applied to the row lines 42-1, 42-2, . . . , 42-m, respectively. The gate terminals of the column selecting transistors 44-1, 44-2, . . . , 44-n are connected to a horizontal scanning circuit 47. Further, signals $\Phi_{S1}$, $\Phi_{S2}$, . . . $\Phi_{Sn}$ are applied to the column lines 44-1, 44-2, . . . , 44n, respectively. Incidentally, each of the CMDs is formed on the same substrate to which the substrate voltage $V_{SUB}$ is applied. Additionally, the vertical scanning circuit 46 and the horizontal scanning circuit 47 are driven in response to start pulses of a single kind and to clock pulses of two kinds.

Figure 11:
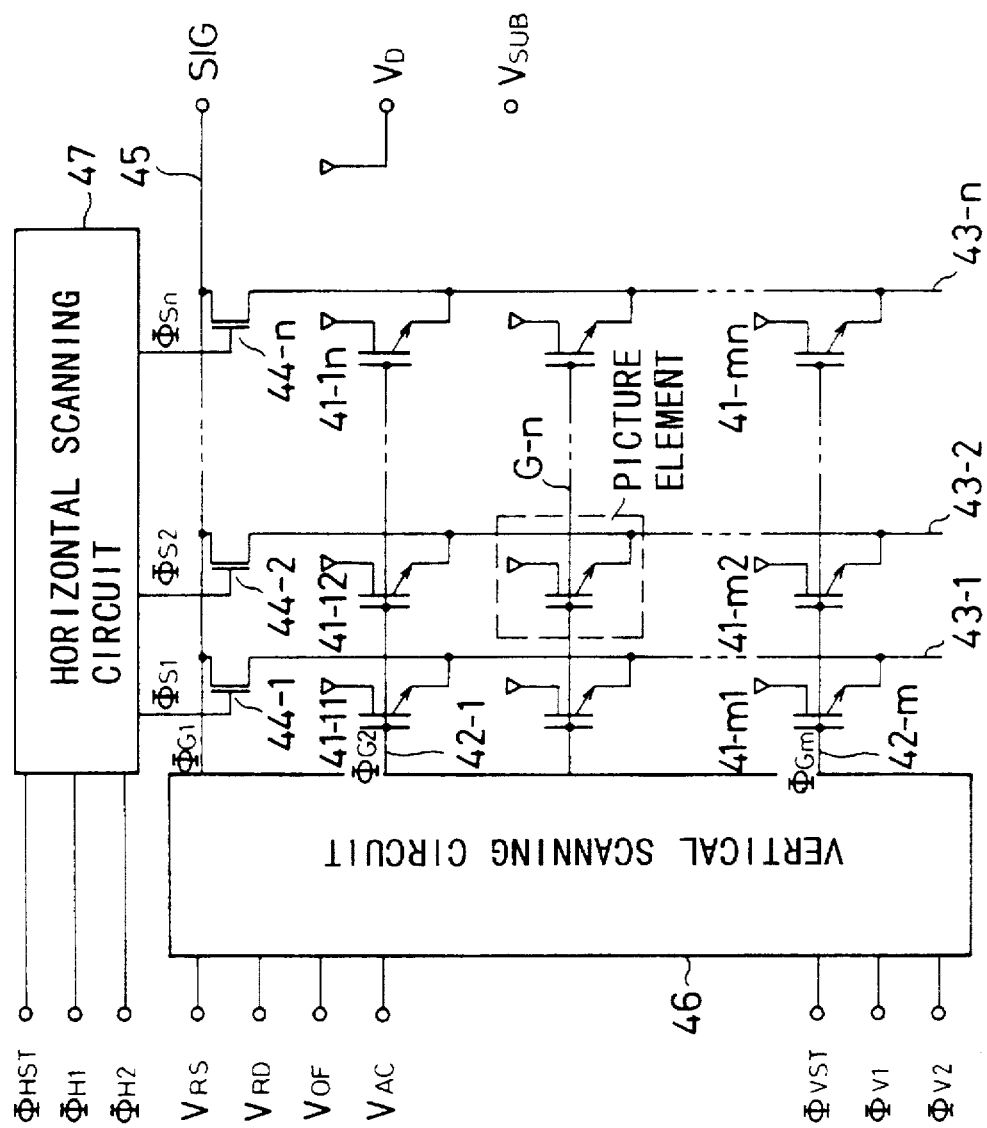
FIG. 11 is a circuit diagram for illustrating the entire configuration of a, two-dimensional CMD image sensor of the second embodiment of the present invention.
Figure 12:
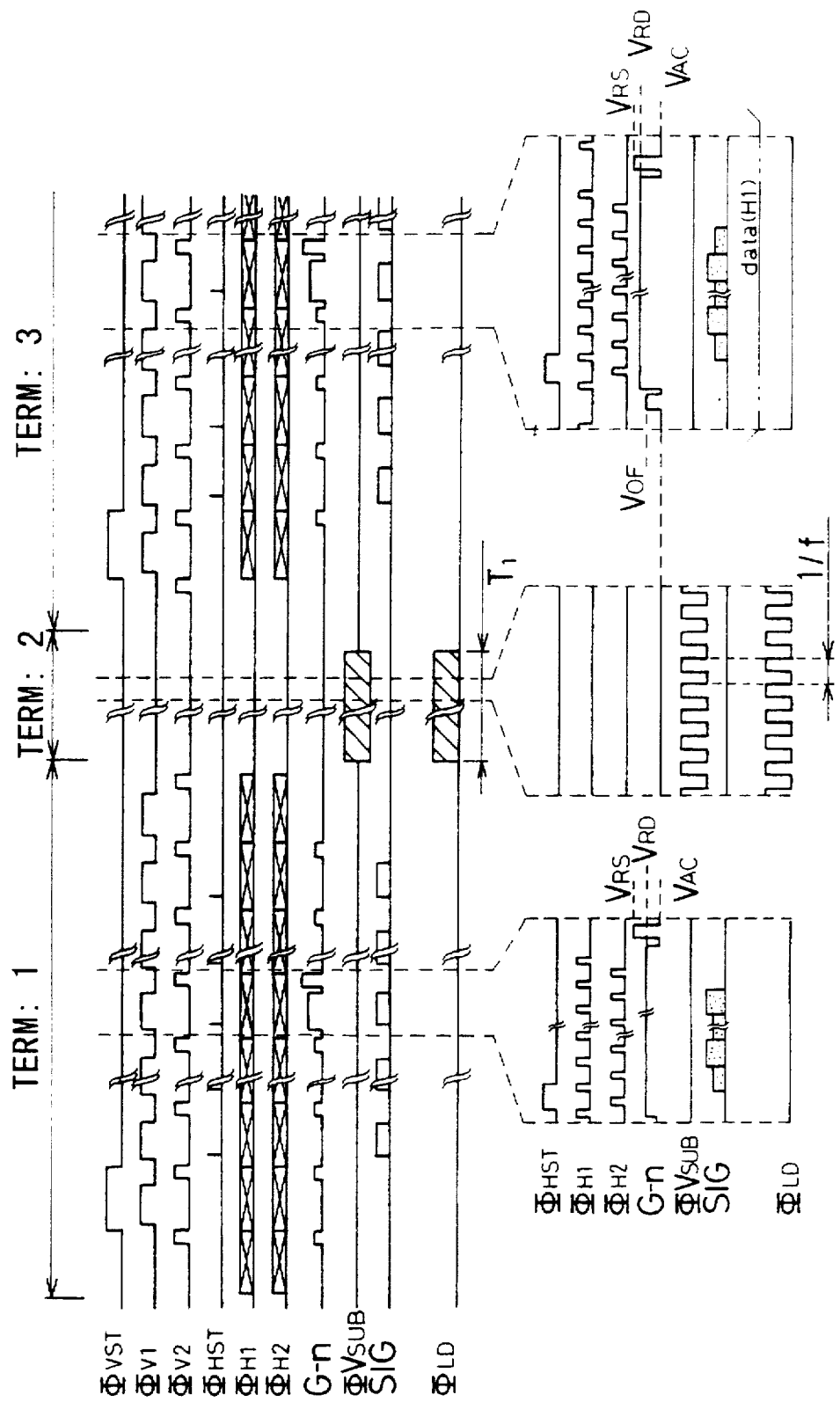
FIG. 12 is a timing chart for illustrating an operation of the CMD image sensor of FIG. 11.
Figure 13:
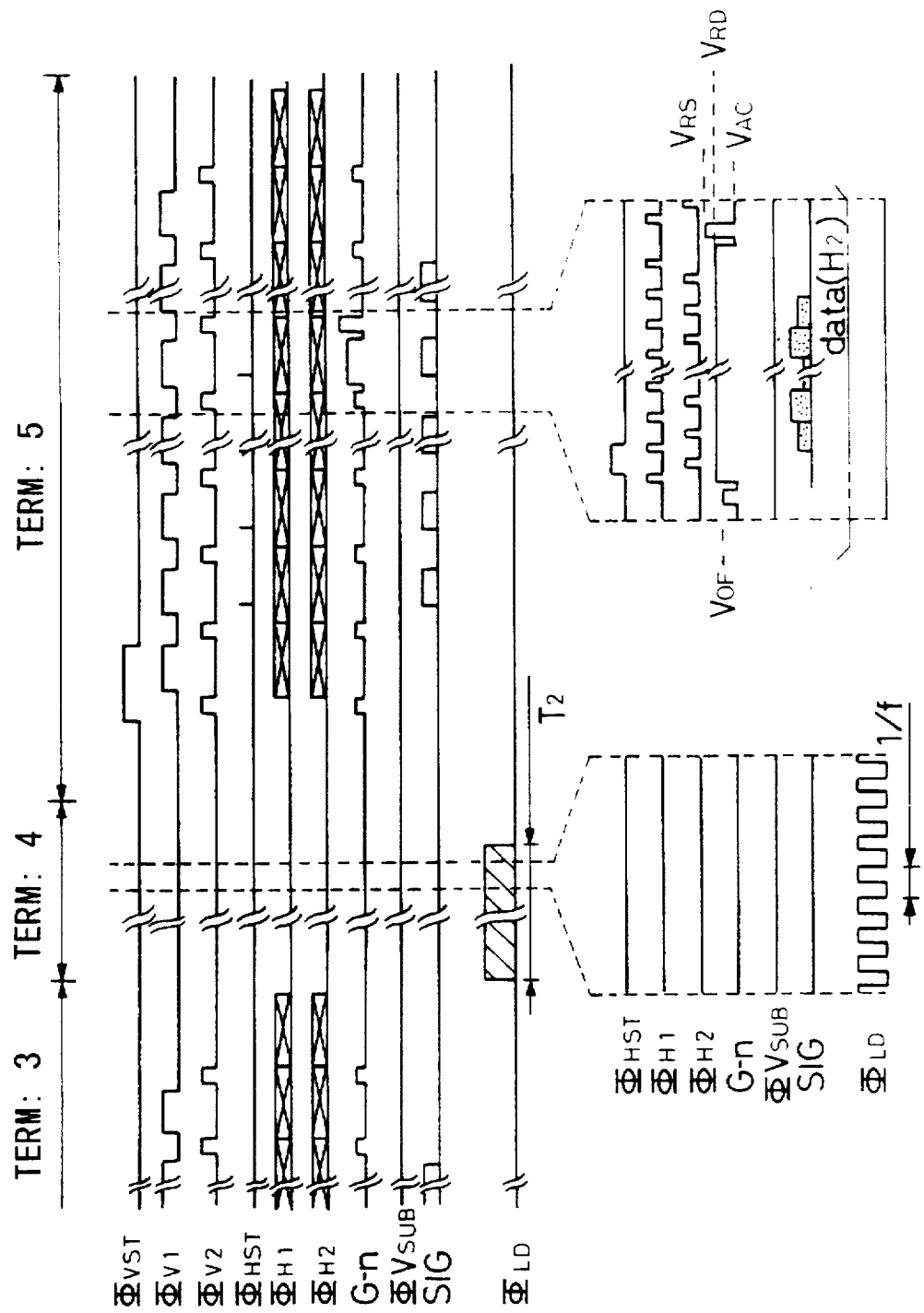
FIG. 13 is a timing chart for illustrating an operation of the CMD image sensor, which is subsequent to the operation thereof illustrated in FIG. 12 (namely, a timing chart continued from FIG. 12)

FIGS. 12 and 13 are diagrams showing the waveforms of signals for illustrating an operation of the two-dimensional CMD image sensor of FIG. 11. Incidentally, FIG. 13 is a diagram for showing the waveforms of signals, which is continued from FIG. 12. In these figures, a signal G-n is shown as a typical example of signals applied to the row lines 42-1, 42-2, . . . , 42-m. The voltage represented by the row-line pulse can be a readout gate voltage $V_{RD}$, a reset voltage $V_{RS}$, an overflow voltage $V_{OF}$ or an accumulation voltage $V_{AC}$. In the case of a pulse corresponding to a row line which is not selected, the voltage represented by such a pulse is the accumulation voltage $V_{AC}$ during a horizontal effective period of a video signal. Further, during a horizontal blanking period thereof, the voltage represented by such a pulse is the overflow voltage $V_{OF}$. In the case of a pulse corresponding to a row line which is selected, the voltage represented by such a pulse is the read-out gate voltage $V_{RD}$ during a horizontal effective period of a video signal. Further, during a horizontal blanking period thereof, the voltage represented by such a pulse is the reset voltage $V_{RS}$. Thus, after a start pulse $\Phi_{VST}$ is inputted, the row lines are selected in sequence according to the two-phase clock pulses $\Phi_{V1}$ and $\Phi_{V2}$ inputted to the vertical scanning circuit 46. Further, during the selection of the row line, a start pulse $\Phi_{HST}$ is inputted and signals corresponding to the picture elements are read out to the signal line 45 serially according to the two-phase clock pulses $\Phi_{H1}$ and $\Phi_{H2}$ inputted to the horizontal scanning circuit 47.

Next, a practical operation of the two-dimensional rangefinding sensor using such a two-dimensional CMD image sensor will be described hereinbelow. In the term 1 of FIG. 12, the two-dimensional CMD image sensor performs an ordinary reading operation. This operation serves as a reset operation of clearing the signal charge of the two-dimensional rangefinding sensor. Therefore, this ordinary operation is not always necessary, and another driving method may be employed as long as the reset of the signal charge can be achieved by performing such a driving method.

Moreover, in the case that this sensor is continuously operated as the two-dimensional rangefinding sensor, an operation of reading a signal in the term 5 (to be described later) can be simultaneously utilized as the operation of resetting the signal charge.

Next, in the term 2, input pulses to each of the scanning circuits 46 and 47 are fixed or kept in a state by which each picture element is put into a light receiving condition. Thereafter, for a time period $T_1$, (the condition of) the light source is modulated in response to a clock pulse having a frequency f. Then, the object is illuminated with light emitted from such a light source. Further, the substrate voltage $V_{SUB}$ of the CMD image sensor is modulated in synchronization with the clock pulse having the frequency f. Subsequently, in the term 3, the ordinary reading operation is performed on the CMD image sensor, so that signals accumulated therein as a result of the illumination modulation and the sensitivity modulation performed in the term 2 are read out therefrom. Incidentally, $H_1$ designates a read-out signal at that time.

Moreover, in the subsequent term 4, input pulses to each of the scanning circuits 46 and 47 are fixed in the state by which each picture element is put into the light receiving condition, similarly as in the case of the operation performed in the term 2. Thereafter, for a time period $T_2$, the light source is modulated in response to a clock pulse having a frequency f. Then, the object is illuminated with light emitted from such a light source. However, this time, the sensitivity modulation is not performed differently from the case of the operation performed in the term 2. Further, the substrate voltage $V_{SUB}$ of the CMD image sensor is set at a direct-current (DC) voltage, at which an ordinary image pickup condition is realized. Subsequently, in the term 5, the ordinary reading operation is performed on the CMD image sensor, so that signals accumulated in each picture element in consequence of the illumination modulation performed in the term 4 are read out therefrom. Incidentally, $H_2$ designates a read-out signal at that time.

Further, data read out as a result of the sequence of these operations are given by the following equations (8), (9), (10), (11) and (12):

$$H_i = h_1 \cdot t + h(z) \cdot t + h_2 \cdot t \quad (8)$$

$$h_i = k_1 \cdot I(x,y) \quad (9)$$

$$h(z) = k_2 \cdot I(x,y) \cdot f(z) \quad (10)$$

where i=1, 2 and h, designates a DC component; $h_2$ the current level of a dark current; h(z) a modulation detection component; t time; $k_1$, $k_2$ proportional constants; I(x,y) two-dimensional luminance information concerning an object; and f(z) range information concerning the object.

$$H_1 = T_1 \cdot [I(x,y) \cdot \{k_1 + k_2 f(z)\} + h_2] \quad (11)$$

$$H_2 = T_2 \cdot \{I(x,y) k_1 + h_2\} \quad (12)$$

The aforementioned operations will be described hereunder by considering the correspondence relation between this embodiment and the first embodiment of FIGS. 4 to 7. First, a sensitivity modulation pulse $\Phi_{SM}$ is applied from the control signal generator 14 to the sensitivity modulation driving portion 11. Then, the pulse driving of the voltage $V_{SUB}$ applied to the substrate of the CMD image sensor 1 is carried out in response to the pulse $\Phi_{SM}$. On the other hand, a light-source modulation pulse $\Phi_{LD}$ is applied from the control signal generator 14 to the light-source modulation driver 18, so that the light source 19 is driven in response to the pulse. The substrate application voltage $V_{SUB}$ is modulated in a period (or cycle) $T_0$ for a duration T, between (−2) V and (−20) V according to the pulse $\Phi_{SM}$ of FIG. 6. The light source 19 undergoes luminance modulation in a period $T_0$ for the duration $T_1$ in synchronization with the substrate application voltage $V_{SUB}$. In addition, luminance modulation is also performed on the light source 19 in the same period To for the duration $T_2$.

The two-dimensional CMD image sensor 13 has two image capture modes. Namely, one of the modes is a range(-data) image capture mode, and the other is a luminance image capture mode. The image capture mode used for the duration $T_1$ is the former, namely, the range image capture mode. The image capture mode used for the duration $T_2$ is the latter, namely, the luminance image capture mode. The substrate application voltage V SUB can change from (−2) V to (−20) V in the range image capture mode. As can be seen from FIGS. 8 and 9, the thickness of a photoelectric conversion layer in the case of setting the substrate application voltage $V_{SUB}$ at (−2) V and further setting the gate potential $V_G$ at (−6) V is far larger than that of the photoelectric conversion layer in the case of setting the substrate application voltage $V_{SUB}$ at (−20) V and further setting the gate potential $V_G$ at (−1) V. In other words, the case of setting the substrate application voltage $V_{SUB}$ at (−2) V and further setting the gate potential $V_G$ at (−6) V corresponds to the case of FIG. 9. Further, the case of setting the substrate application voltage $V_{SUB}$ at (−20) V and further setting the gate potential $V_G$ at (−1) V corresponds to the case of FIG. 8. The luminance modulation of the light source is performed in such a way that the highest light output is obtained when setting the substrate application voltage $V_{SUB}$ at (−2) V and further setting the gate potential $V_G$ at (−6) V, and that the lowest light output is obtained when setting the substrate application voltage $V_{SUB}$ at (−20) V and further setting the gate potential $V_G$ at (−1) V. In the luminance image capture mode, the sensor is established in such a manner that the high sensitivity state obtained by setting the substrate application voltage $V_{SUB}$ at (−2) V and further setting the gate potential $V_G$ at (−6) V is maintained and that the substrate application voltage $V_{SUB}$ is maintained at a constant value for the duration $T_2$.

Figure 14:
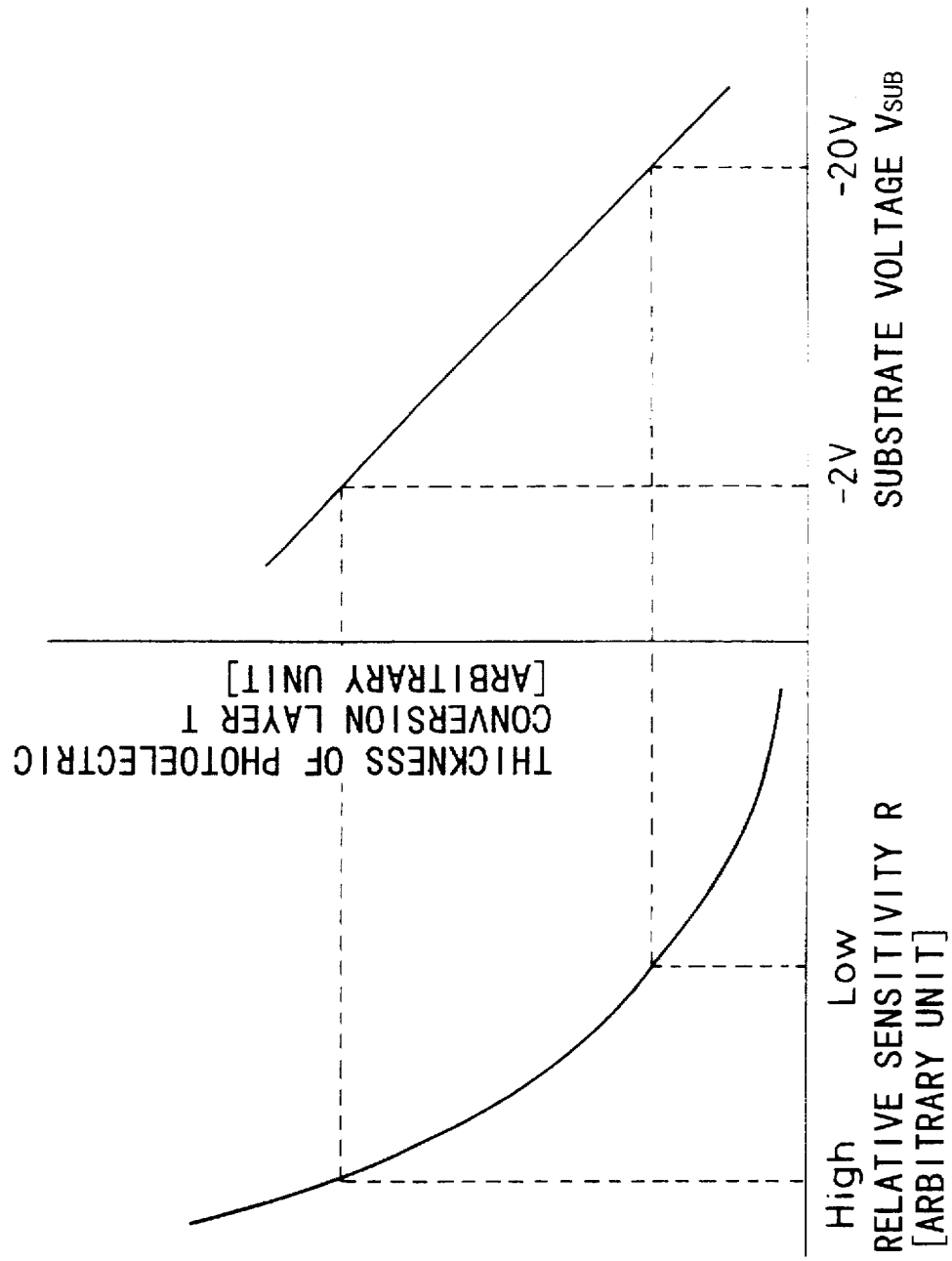
FIG. 14 is a graph for illustrating the relations among the thickness of a photoelectric conversion layer of a CMD, the relative sensitivity and voltage level of the substrate thereof.

FIG. 14 is a graph for illustrating the relations among the relative sensitivity R of the substrate, the thickness T μm of the photoelectric conversion layer and the voltage level $V_{SUB}$ of the substrate. When the substrate voltage $V_{SUB}$ increases negatively, the thickness T of the photoelectric conversion layer decreases and the relative sensitivity (namely, the relative light absorptance) R of the substrate becomes lower. Conversely, when the substrate (application) voltage $V_{SUB}$ is close to 0 (V), the thickness T of the photoelectric conversion is large and the relative sensitivity R is high.

Meanwhile, in the aforesaid range image capture mode, range image information concerning an object is affected by the luminance information concerning the object, as will be described hereinbelow. Thus, there is the necessity of making some compensation for the range information.

Practically, if T denotes an integral time, the number H of holes stored in the gate of each of the picture elements of the two-dimensional CMD image sensor is obtained from the following equations (13), (14) and (15):

$$H = h_1 \cdot T + h(z) \cdot T + h_2 \cdot T \tag{13}$$

$$h_1 = k_1 \cdot I(x,y) \tag{14}$$

$$h(z) = k_2 \cdot I(x,y) \cdot f(z) \tag{15}$$

where $h_1$ designates a DC component; $h_2$ the current level of a dark current; $h(z)$ a modulation detection component; $k_1$, $k_2$ proportional constants; $I(x,y)$ two-dimensional luminance information concerning an object; and $f(z)$ range information concerning the object.

The range information $f(z)$ is given by the following equation (16) obtained from the equations (3) and (4):

$$f(z) = 1 - 4 \cdot z/(T_0 \cdot c) \tag{16}$$

where $T_0$ designates a single period of the luminance modulation.

An output obtained in each of the image capture modes is given by the following equations (17) and (18):

$$H_1 = T_1 \cdot [I(x,y) \cdot \{k_1 + k_2 \cdot f(z)\} + h_2] \tag{17}$$

$$H_2 = T_2 \cdot [I(x,y) \cdot \{k_1 + k_2 \cdot 1\} + h_2] \tag{18}$$

where $H_1$ designates an output obtained in the range image capture mode; and $H_2$ an output obtained in the luminance image capture mode.

Namely, $H_1$ and $H_2$ correspond to the range image capture mode and the luminance image capture mode, respectively. Further, $H_1$ and $H_2$ correspond to data represented by a signal $\Phi_{DATA}$ read out in the terms $T_{10}$ and $T_{20}$, respectively.

The range information $f(z)$ given by the equation (16) is modified as the following equation (19) by using the equations (17) and (18):

$$f(z) = (T_2/T_1) \cdot (H_1 - h_2 \cdot T_1)/(H_2 - h_2 \cdot T_2) \cdot (1 + k_1/k_2) - k_1/k_2 \tag{19}$$

In the equation (19), ($k_1/k_2$) denotes the ratio of the intensity of the DC component to the intensity of the modulation component in the case that the luminance modulation of the light source and the sensitivity modulation of the image sensor are carried out. Further, as is understood from this equation, the range information is obtained as the difference between the first term and the second term of the right side of the equation (19). Thus, unless the intensity of the modulation component is higher than that of the DC component, the accuracy of the range information is deteriorated owing to a cancelling error (namely, to the degradation of the S/N). Therefore, in order to limit the off-set output of the dark current of the image sensor to a low level, it is necessary to enhance the rangefinding accuracy by eliminating the influence of background light which is similar to that of the DC component. As countermeasures against this, it is preferable that the sensor is provided with an optical band-pass filter adapted to transmit only light of the wavelength band in the vicinity of the wavelength of light emitted from the illumination light source and further adapted to cut off the background light. Further, in the case of using the optical band-pass filter 16, it is desirable that an object is illuminated with light emitted from a light source, whose energy is concentrated on a specific wavelength band. Thus, a light-emitting diode (LED) or a laser diode (LD) is usually used as the light source.

Incidentally, to enhance the rangefinding accuracy, judging from the principle of the detecting method, it is preferable that the number of iteration of the cycle or period of the sensitivity modulation is set at a large value. Thus, the integral time (namely, a time period between a moment, at which the picture-element charge is reset, and another moment at which the picture-element charge is readout) becomes inevitably long. In the equation (19), $h_2$ is a factor representing the generation rate of the dark current. Therefore, if the integral time $T_1$ or $T_2$ becomes long, the accuracy of the range information is degraded owing to the cancelling error. Consequently, when rangefinding with high accuracy, the factor $h_2$ representing the generation rate of the dark current should be reduced. Improvements for realizing this will be described in the aftermentioned description of a third embodiment of the present invention. In the foregoing description of the second embodiment, the problems of the intensity of the modulation component and the dark current have been discussed. These problems do not related only to the sensors using the CMD image sensors but are common to all of the two-dimensional rangefinding sensors of the present invention.

Generally, when measuring distances of several to ten meters by means of the range finder, the period $T_0$ of modulation signals is 0.1 μm or so. However, in the case where the range or distance is 1 m or so, high-accuracy three-dimensional image input is strongly demanded. In this case, the period $T_0$ of modulation signals is 10 ns or so. Thus, the sensitivity modulation should be achieved at the frequency of the order of 100 megahertz (MHz). Consequently, there is the necessity of achieving the sensitivity modulation of the two-dimensional image sensor, which is the essential element (or principle) of the present invention, at a high speed. In the case of ordinary solid-state image sensors, the typical one of which is a CCD, the photoelectric conversion region of the picture element is not completely depleted, charges generated by the incidence of light in a semiconductor substrate are diffused therein according to the gradient of the density of electric charges. Therefore, even if trying to achieve the sensitivity modulation by the change of the volume of the photoelectric conversion region at a high speed through bias modulation, high-speed sensitivity modulation cannot be realized because of the low-speed re-arrangement of the diffused charges. In contrast with this, in the case of using the CMD image sensor, the photoelectric conversion region of the picture element is completely depleted, so that all of the charges generated by the incidence of light in a semiconductor substrate are moved in the presence of the electric field therein. Thus, the movement of the charges due to the diffusion in accordance with the gradient of the density of electric charges does not occur at all. Consequently, the high-speed sensitivity modulation, which is impossible for the ordinary solid-state image sensors (typically, a CCD) whose photoelectric conversion region is not completely depleted, can be achieved. Namely, a characteristic aspects of this embodiment reside in that the CMD image sensor is used as the solid-state image sensor, that the high-speed sensitivity modulation is performed by modulating the substrate bias and that a two-dimensional rangefinding sensor, which can rangefind with high rangefinding accuracy, is realized.

Figure 15:
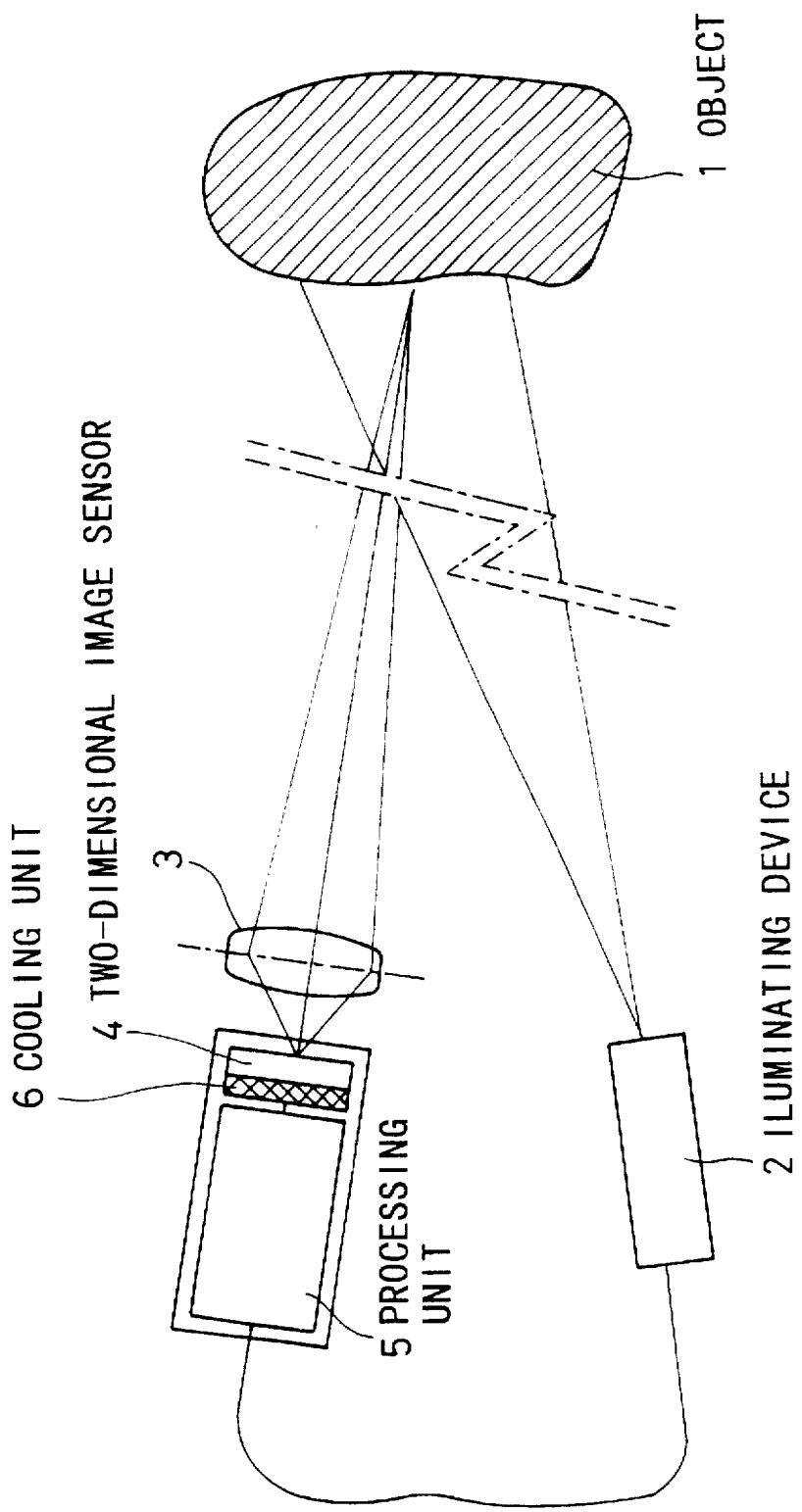
FIG. 15 is a diagram for illustrating the conceptual configuration of a third embodiment of the present invention.

Next, the third embodiment of the present invention will be described with reference to FIG. 15. In this figure, same reference numerals designate same or corresponding functional components illustrated in FIG. 3. Further, the description of such components is omitted herein, for simplicity of description. As stated in the description of the second embodiment, it is preferable for enhancing the rangefinding accuracy that the number of iteration of the cycle or period of the sensitivity modulation is set at a large value. Thus, the integral time (namely, a time period between a moment, at which the picture-element charge is reset, and another moment at which the picture-element charge is readout) becomes inevitably long. Consequently, the dynamic range is lowered owing to the dark current. This affects actual ranging accuracy. The third embodiment of the present invention is created to resolve such a problem. As illustrated in FIG. 15, a cooling unit 6 such as a Peltier device is provided in a rear portion of the two-dimensional solid-state image sensor. Thus, the two-dimensional dark current can be reduced by cooling the device by means of the cooling unit. With such a configuration, the long-time integration, which is impossible for the ordinary device, can be achieved. This results in realizing a tow-dimensional rangefinding sensor, whose rangefinding accuracy is enhanced.

Figure 16:
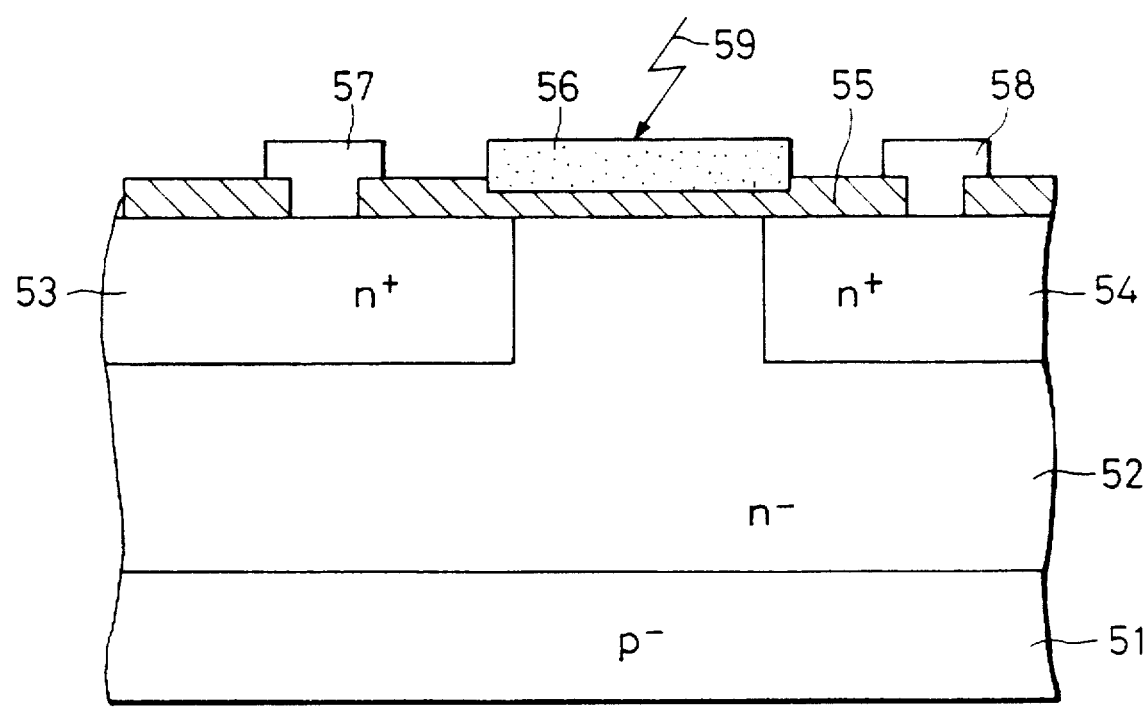
FIG. 16 is a sectional diagram for illustrating the configuration of a picture element of a two-dimensional CMD image sensor.

Next, a fourth embodiment of the present invention will be described hereinafter. This embodiment is a two-dimensional rangefinding sensor using CMDs as light receiving picture-elements, which is able to achieve the sensitivity modulation at a higher speed. First, a sectional view of the configuration of a CMD picture element is illustrated in FIG. 16. The configuration of this CMD picture element will be briefly described again by referring to this figure. Reference numeral 51 designates a p⁻-substrate; 52 an n⁻-channel layer; 53 an n⁺ source diffusion layer; 54 an n⁺ drain diffusion layer; 55 a gate insulation film; 56 a gate poly-silicon electrode; 57 a source electrode; and 58 a drain electrode. The light receiving operation of this CMD picture element has been described with reference to FIG. 5. Therefore, the description of such an operation is omitted herein.

Figure 17A:
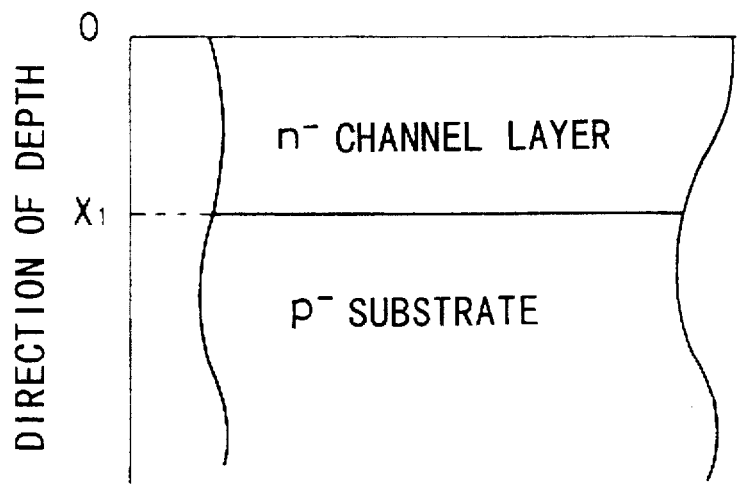
FIGS. 17A and 17B are graphs for illustrating the distribution of impurities in an ordinary CMD.
Figure 17B:
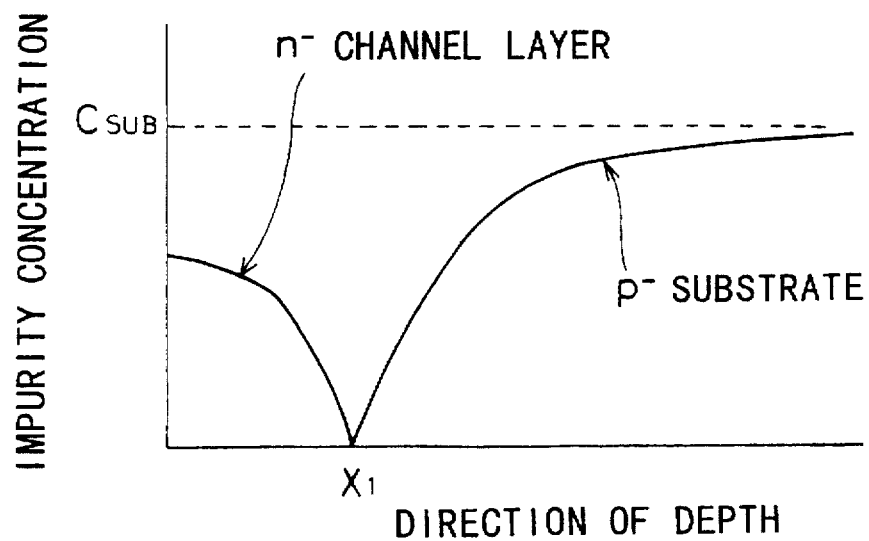

Meanwhile, in the case of the CMD image sensors using CMD picture elements, a p⁻-substrate, whose impurity concentration is about $6 \times 10^{13}$ cm⁻³, is used without any change as the back-gate-electrode substrate of the CMD picture element. Further, an n⁻-channel layer, whose impurity concentration is about $1 \times 10^{13}$ cm⁻³ and thickness is 3 to 10 μm, is formed thereon. Namely, as illustrated in FIGS. 17A and 17B, a high-resistance n⁻-channel layer, which is $X_1$ in thickness, is formed on the p⁻-substrate, whose impurity concentration is constant substrate concentration $C_{SUB}$. Then, in the case of modulating the sensitivity of the CMD picture element by changing the potential $V_{SUB}$ applied to the p⁻-substrate 51, the maximum modulation frequency $f_{MAX}$ is given by the following equation (20):

$$f_{MAX}=1/(C \cdot R_{SUB}) \quad (20)$$

where C designates the capacitance of the surface depletion layer of the CMD, which is obtained by the following equation (21). Namely, $$C=k_{si}\epsilon_o/X_{dep} \quad (21)$$

where $k_{si}$=11.8 and $\epsilon_o$=8.86×10⁻¹⁴ F/cm. Additionally, in the case of the CMD picture element, $X_{dep}$ is 10 μm on average. When calculating by using these numerical values, the capacitance C of the surface depletion layer is found as follows:

$$C=1.0 \times 10^{-9} \text{ F/cm} \quad (22)$$

Further, in the case that the concentration in the p⁻-substrate is $6 \times 10^{13}$ cm⁻³, the resistivity ρ is 300 Ωcm. Furthermore, the resistance per unit area $R_{SUB}$ is expressed by the following equation (23):

$$R_{SUB}=\rho \cdot t_{SUB} \quad (23)$$

Incidentally, the thickness $t_{SUB}$ of the substrate is 500 82 m in the case of a conventional silicon substrate. Then, the following equation (24) is obtained by substituting this value in the equation (23).

$$R_{SUB}=15 \text{ }\Omega\text{cm}^2 \quad (24)$$

Thus, $f_{MAX}$ is 64 MHz by the equation (20).

Meanwhile, in the case of the sensitivity modulation method, the findable range L is given by the distance which light can travel in a time period corresponding to a half of the modulation frequency $f_{MAX}$. Namely, L is obtained by the following equation (25):

$$L=c/f_{MAX}/2 \quad (25)$$

As a result of substituting $c=3\times10^8$ m/s and $f_{MAX}=64$ MHz in the equation (25), L is obtained by the following equation (26):

$$L=2.34 \text{ m} \quad (26)$$

In the field in which the inputting of three-dimensional information is demanded, high-accuracy measurement of a short range, which is far shorter than the aforementioned value of L, is sometimes required. In accordance with this embodiment, there is provided a two-dimensional CMD image sensor which meet such a requirement. To obtain higher range resolving power and rangefind with high accuracy, $f_{MAX}$ should be increased. Further, $f_{MAX}$ is given by the following equation (27) by using the equation (20), (21) and (22):

$$f_{MAX}=1/(C \cdot R_{SUB})=X_{dep}/(k_{si}\epsilon_o \cdot \rho \cdot t_{SUB}) \quad (27)$$

where $X_{dep}$, $k_{si}$ and $\epsilon_o$ are values inherent in the CMD and thus cannot be changed largely. Namely, $f_{MAX}$ can be practically increased by lowering the resistivity ρ or by reducing the thickness $t_{SUB}$ of the substrate.

Figure 18A:
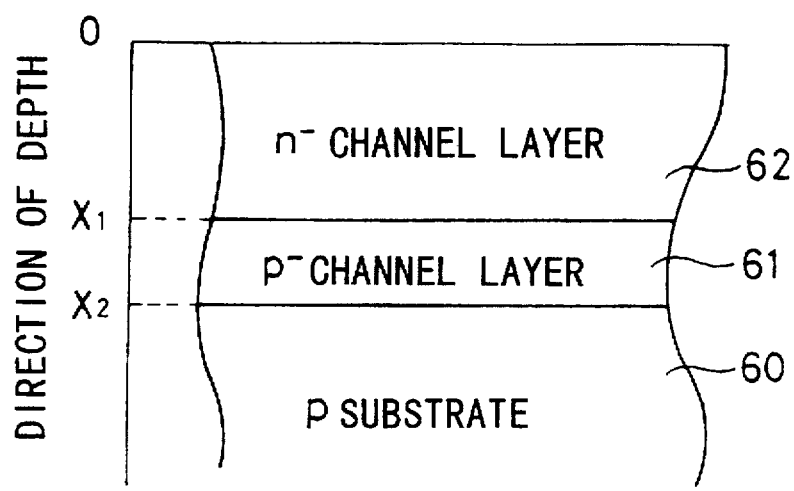
FIGS. 18A and 18B are diagrams for illustrating the distribution of impurities in a CMD of a fourth embodiment of the present invention.
Figure 18B:
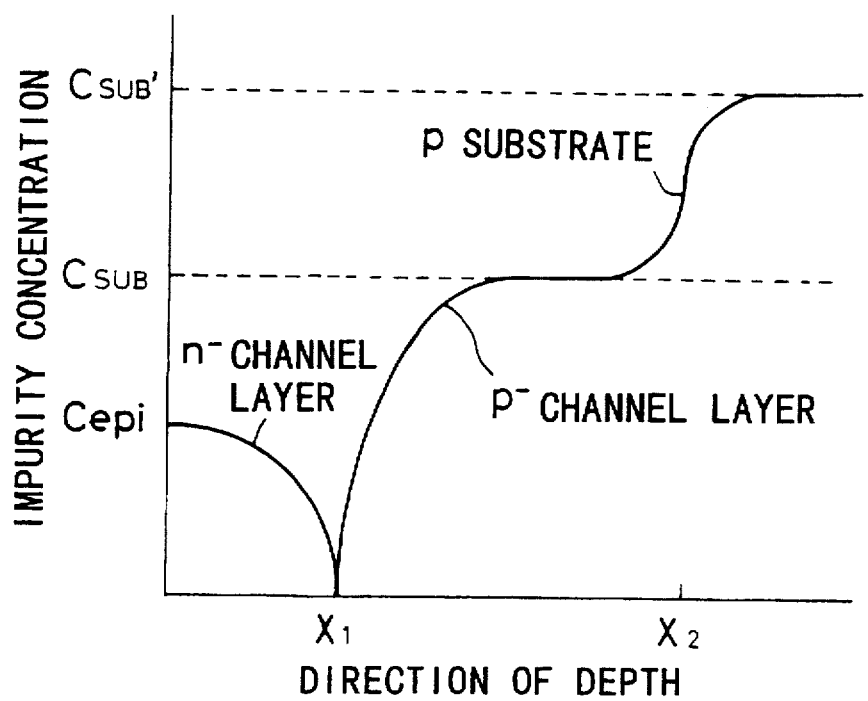

First, the process for lowering the resistivity ρ will be described hereunder. The inventor of the present invention has previously proposed a method of producing a CMD by forming both of the n⁻-channel layer and the p⁻-substrate by performing the epitaxial (growth) method, in Japanese Patent Laid-Open. No. 3-114260/1991. FIG. 18A illustrates a sectional view of the configuration of the substrate of the CMD image sensor obtained by performing such a producing method. Namely, a p⁻-channel layer 61 having the concentration $C_{SUB}$ and an n⁻-channel layer 62 having the concentration $C_{epi}$ are formed serially by performing the epitaxial method on the p-type substrate 60 having the concentration $C_{SUB}'$. An example of the concentration distribution in the case of such a substrate is illustrated in FIG. 18B. Because the p⁻-channel layer 61 and the n⁻-channel layer 62 are formed by performing the epitaxial method, the concentration $C_{SUB}'$ of the p-type substrate 60 can take an arbitrary value. However, in the case of FIG. 18B, the concentration $C_{SUB}'$ is set in such a manner that $C_{SUB}'>C_{SUB}$, for the purpose of increasing $f_{MAX}$. Namely, in consequence of setting the concentration $C_{SUB}'$ in such a way that this inequality condition ($C_{SUB}'>C_{SUB}$) is satisfied, the resistivity ρ of the substrate is reduced. Thus, as is seen from the equation (27), $f_{MAX}$ is enhanced. For example, the resistivity ρ can be reduced to 1 Ωcm if this embodiment is established in such a way that $C_{SUB}=2 \times 10^{16}$ cm⁻³ instead of setting ρ=300 Ωcm ($C_{SUB}=6\times10^{13}$ cm⁻³), similarly as in the conventional case. Namely, in comparison with the conventional case that ρ=300 Ωcm, the maximum modulation frequency $f_{MAX}$ can be improved by a factor of 300.

Next, the reduction in thickness $t_{SUB}$ of the substrate will be described hereinbelow. In the case of the conventional method of producing a CMD image sensor, a substrate, whose thickness $t_{SUB}$ is 500 µm when completed, is used without any change. However, the thickness $t_{SUB}$ (=500 µm) of the substrate can be reduced by performing the back (-surface) lapping method in the last process of the method of producing the CMD image sensor. For example, thickness $t_{SUB}$ of the substrate can be reduced to 100 µm if a part, whose thickness is 400 µm, of the substrate, whose thickness $t_{SUB}$ is 500 µm, is removed from the back surface thereof by the lapping method. Consequently, in this case, the maximum modulation frequency $f_{MAX}$ can be improved by a factor of 5 in comparison with the conventional case that the thickness of the substrate is not reduced.

Thus, a two-dimensional rangefinding sensor, whose modulation frequency can be increased, namely, range-information resolving power (or accuracy) can be enhanced, is able to be realized if at least one of the following two techniques (1) and (2) is applied to a two-dimensional variable-sensitivity CMD image sensor as above described:

(1) An $n^-$-channel layer and a $p^-$-channel layer are formed on a p-substrate by using the epitaxial growth method, and the impurity concentration of the p-substrate is increased in such a manner as to be higher than the concentration of the $p^-$-channel layer, and thereby, the resistivity ρ is lowered.

(2) The thickness $t_{SUB}$ of the substrate is reduced by using the back lapping method.

Needless to say, the maximum modulation frequency $f_{MAX}$ can be further enhanced by using both of the techniques (1) and (2).

Figure 19:
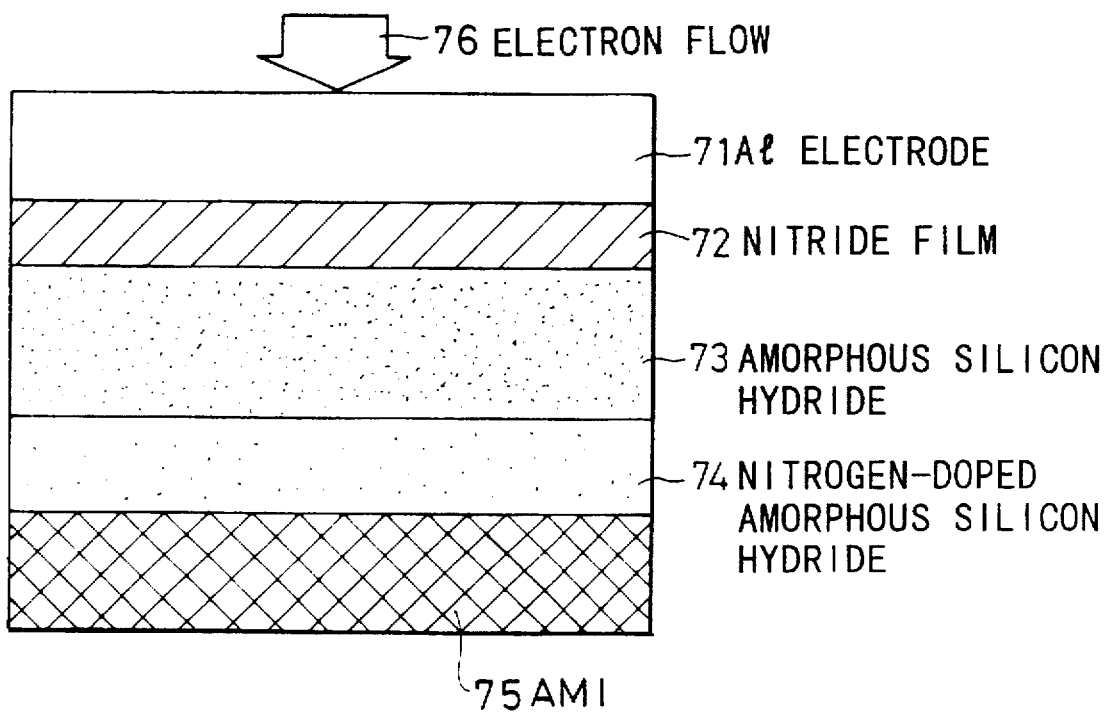
FIG. 19 is a diagram for roughly illustrating the configuration of an electron-bombarded two-dimensional AMI image sensor used as a two-dimensional image sensor of a fifth embodiment of the present invention.
Figure 20:
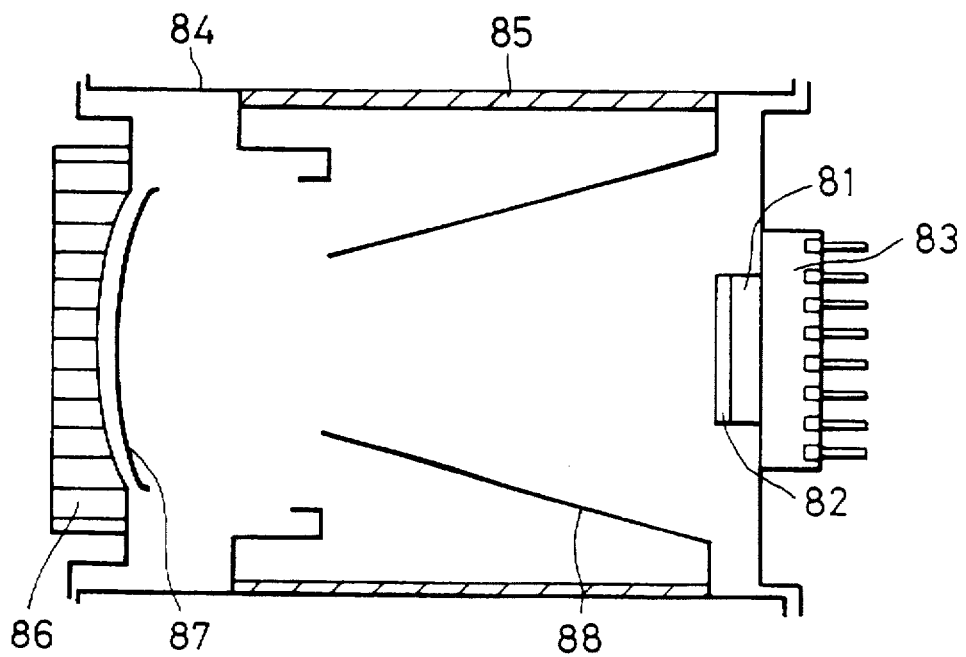
FIG. 20 is a diagram for illustrating the configuration of an electron-bombarded AMI image pickup tube.
Figure 21:
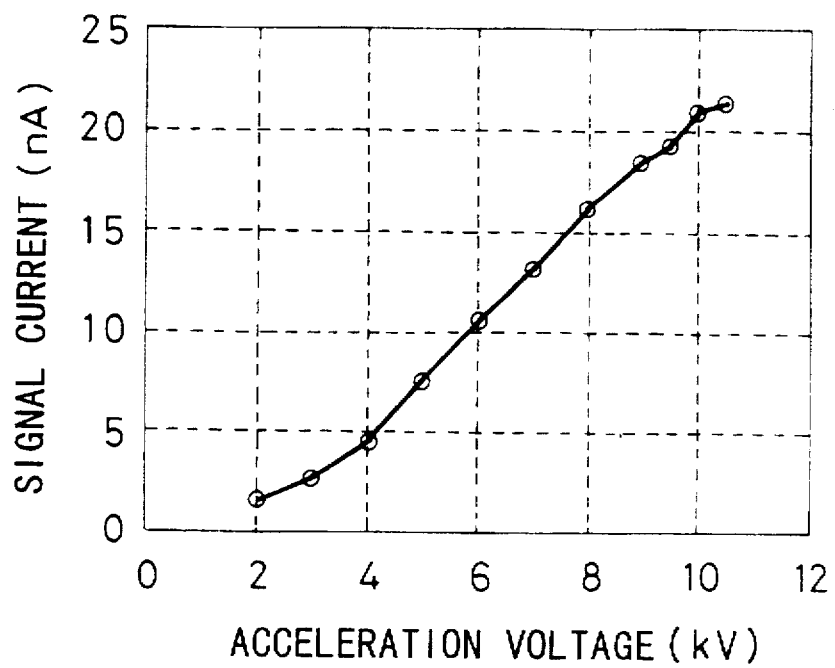
FIG. 21 is a graph for showing the relation between the acceleration voltage and the signal current of the electron-bombarded AMI image pickup tube.

Next, a fifth embodiment of the present invention, which utilizes an electron-bombarded AMI image sensor as the two-dimensional image sensor, will be described hereinbelow. Incidentally, the technical details of the electron-bombarded AMI image sensor are described in an article entitled "An Electron-Bombarded Amorphous Si/AMI Image Intensifier", T. Kawamura et al., Proceedings. Conference on Photoelectronic Image Devices, London, September 1991, pp. 175–182, published by IOP Publishing Ltd., 1992. As illustrated in FIG. 19, in the case of the electron-bombarded AMI image sensor of this embodiment, an aluminum electrode 71, a nitride film 72, an amorphous silicon hydride layer 73 and a nitrogen-doped amorphous silicon hydride layer 74 are superposed on a conventional AMI image sensor 75 in such a manner that the amorphous silicon hydride layer 73 is placed in the central portion of the laminated layers. Further, the top aluminum electrode 71 is bombarded with an electron flow 76 by using a device, which is similar to a conventional invertor-type image intensifier, similarly as in the case of an electron-bombarded AMI image tube of FIG. 20. Namely, the electron flow 76 emitted from a photoelectric film is accelerated to a high velocity and then the accelerated electron flow is injected into the amorphous silicon hydride layer 73 so that a large number of hole-electron pairs are generated. Thereby, the amount of signal current flowing through the AMI image sensor 75 is increased. Consequently, high sensitivity can be achieved. Incidentally, in FIG. 20, reference numeral 81 designates an AMI image sensor; 82 an amorphous silicon layer; 83 a ceramic package; 84 an electrode; 85 a glass tube; 86 a fiber plate; 87 a photoelectric film; and 88 an anode:

Referring next to FIG. 21, there is shown a graph for illustrating an example of the relation between the acceleration voltage for accelerating a bombarding electron flow in the case of the electron-bombarded AMI image sensor and the obtained electron flow. As is seen from this figure, for instance, the signal current is about 5 nA when the acceleration voltage is 4 kV. Further, the signal current is about 20 nA when the acceleration voltage is 10 kV. The ratio of the sensitivities in both acceleration voltages is a factor of 4. Thus, if the electron-bombarded AMI image sensor is used as the two-dimensional image sensor and the acceleration voltage is modulated in synchronization with the luminance modulation frequency of the light source in the two-dimensional rangefinding sensor described in the foregoing description of the first embodiment, the sensitivity can be modulated in synchronization with the luminance modulation frequency, thereby, desirable characters of the two-dimensional rangefinding sensor can be obtained. The characteristic feature of the fifth embodiment resides in that the high-sensitivity characteristics of the electron-bombarded AMI image sensor can be utilized. However, generally, in the case of the two-dimensional rangefinding sensor of the present invention, the intensity of light reflected from a distant object decreases inversely in proportion to the square of the distance between the object and the sensor. Thus, the signal is liable to be weak. This affects the measurement accuracy. Therefore, it is extremely important for operating or utilizing the sensor that large signal current can be obtained by employing the electron-bombarded AMI image sensor in this embodiment.

Figure 22:
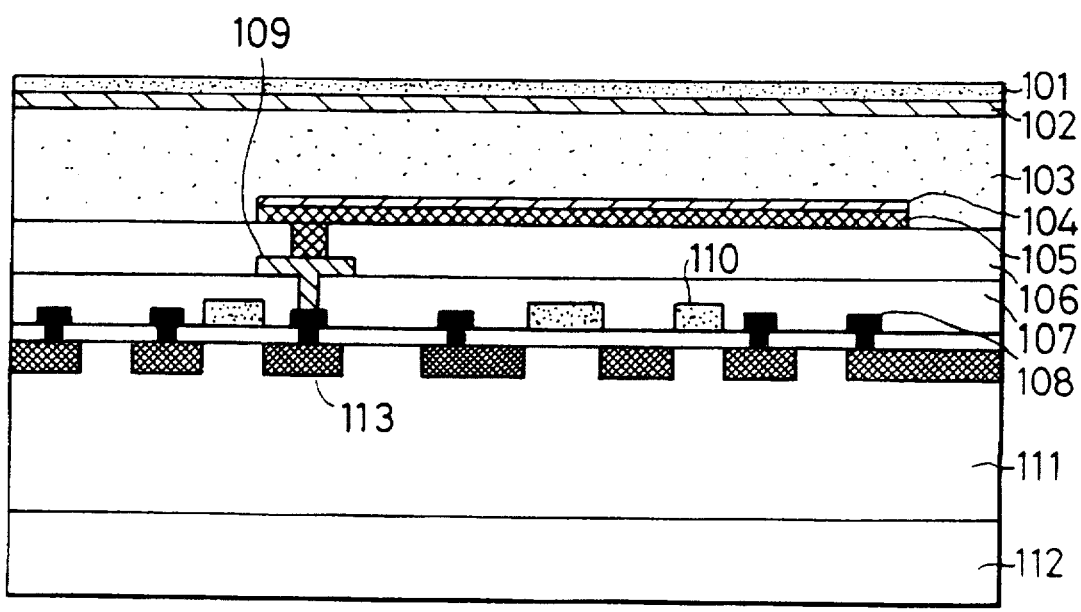
FIG. 22 is a sectional diagram for illustrating the configuration of a laminated two-dimensional AMI image sensor used as a two-dimensional image sensor of a sixth embodiment of the present invention.

Next, a sixth embodiment of the present invention, which a laminated AMI image sensor is used as the two-dimensional image sensor of the two-dimensional rangefinding sensor, will be described hereinbelow. The technical details of the laminated AMI image sensor are described in an article entitled "An Amplified MOS Imager overlaid with an Amorphous Se Photoconductive Layer on its Surface", Ando et al., NHK Broadcasting Technical Research Laboratories R & D, No. 32, pp. 28–36, August 1994. In the case of the laminated AMI image sensor employed in this embodiment, as illustrated in FIG. 22, a first inter-layer insulation film 107, a second layer aluminum electrode 109, a second inter-layer insulation film 106, a third layer aluminum electrode 105, a fourth layer aluminum electrode 104, an amorphous silicon photoconductive film 103, a CeO film 102 and a transparent electrode (ITO) 101 are superposed on an AMI of the configuration which is similar to that of a conventional AMI and is produced by forming an n-type diffusion layer 113 or the like in a p-type well 111 formed on an n-type silicon substrate 112 and by performing an interconnecting process on the surface thereof by using poly-silicon 110 and a first aluminum electrode 108.

Figure 23A:
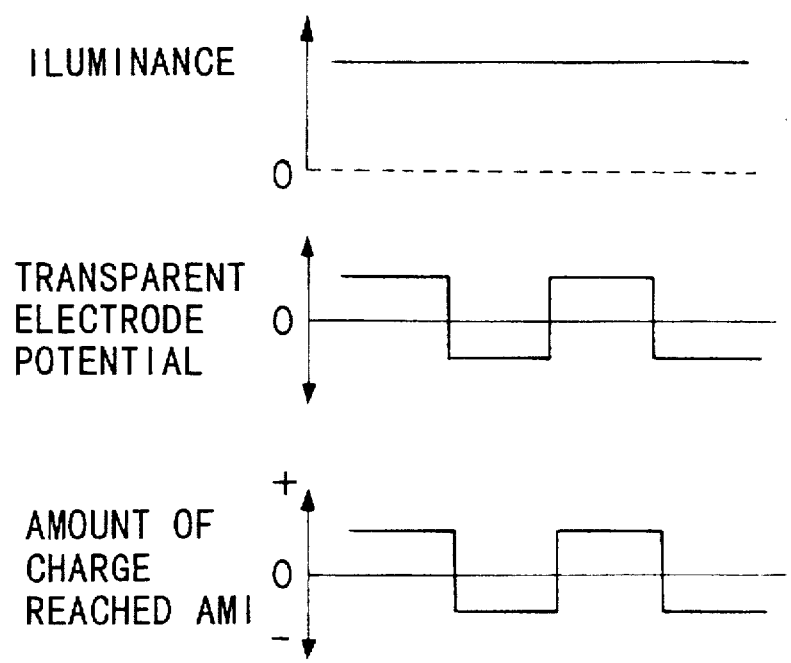
FIGS. 23A and 23B are timing charts for illustrating the manner of the modulation of the laminated two-dimensional AMI image sensor.
Figure 23B:
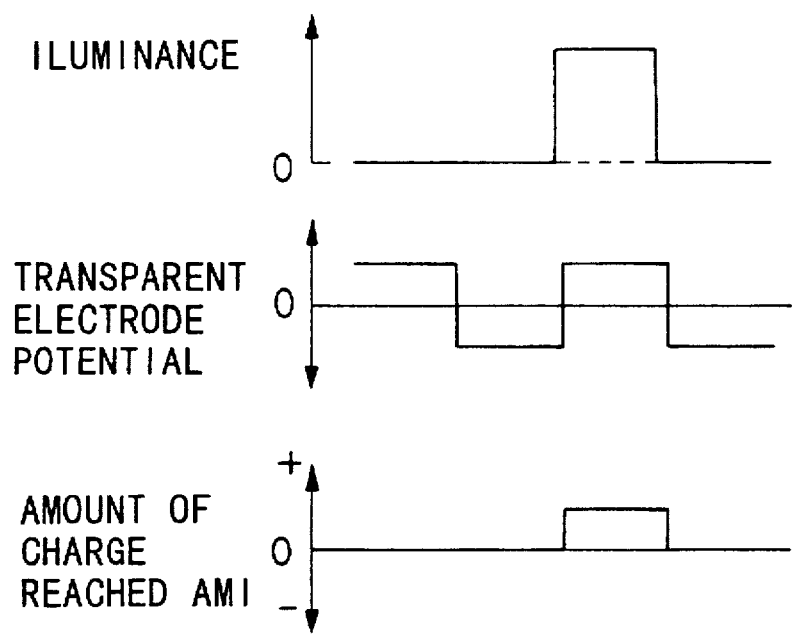

Next, an operation of the laminated AMI image sensor having such a configuration will be described hereinbelow. When applying a positive voltage to the transparent electrode (ITO) 101 provided in the upper portion relative to the AMI provided in the lower portion, holes travel toward the AMI among hole-electron pairs generated by photons having impinged on the amorphous silicon photoconductive film 103. Thereafter, the holes reach the signal electrode of the AMI and are stored therein as signal charges. Conversely, when applying a negative voltage to the transparent electrode (ITO) 101 provided in the upper portion relative to the AMI provided in the lower portion, electrons travel toward the AMI among hole-electron pairs generated by photons having impinged on the amorphous silicon photoconductive film 103. Thereafter, the electrons reach the signal electrode of the AMI and are stored therein as signal charges. Hence, if the voltage applied to the transparent electrode (ITO) 101 is switched between positive and negative voltages during an image pickup operation in this laminated AMI image sensor, the charge caused to reach the signal electrode of the AMI provided in the lower portion is also switched between a hole and an electron. If a constant number of photons arrive there like DC component during the image pickup operation is performed switching the applied voltage between positive and negative voltages, a total amount of the charges generated due to the photons comes closer to 0 after stored therein, as illustrated in FIG. 23A. This is because holes and electrons successively reach the signal electrode of the AMI provided in the lower portion. In contrast, if the number of photons coming from the object changes during the image pickup operation, the total amount of the stored charge changes correspondingly to the change in the number of photons, as illustrated in FIG. 23B.

Figure 24:
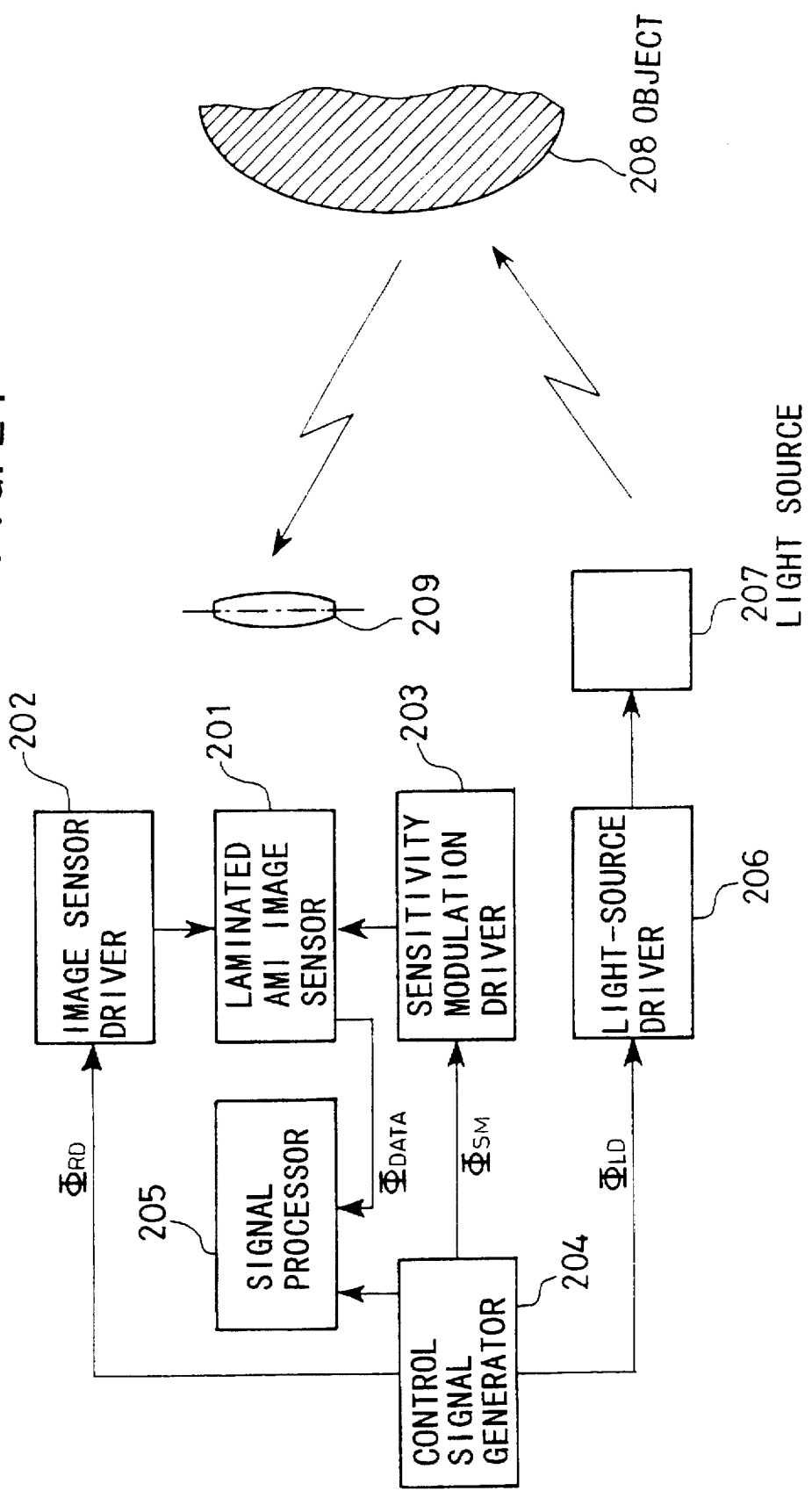
FIG. 24 is a block diagram for illustrating the entire configuration of the sixth embodiment of the present invention.

Next, the configuration of the two-dimensional rangefinding sensor using the laminated AMI image sensor will be described hereunder with reference to FIG. 24. The luminance modulation of the light source 207 is conducted by the light-source driver 206 at a predetermined frequency. Then, an image of a three-dimensional object 208 illuminated with illumination light, which is emitted from this light source 207, is formed on the laminated AMI image sensor 201 through the image-formation optical system 209. Further, the laminated AMI image sensor 201 is driven by the control signal generator 204 and the image sensor driver 202. Then, the information of the image sensor may be readout. At that time, the sensitivity modulation driver 203 changes the potential of the transparent electrode of the laminated AMI image sensor 201 in response to a signal sent from the control signal generator 204. Thereby, the sensitivity is modulated. Moreover, there is caused a shift in the phase of the illumination light received on each picture element, which corresponds to the structure of the three-dimensional object 208. Thus, a large number of signal charges are stored in a picture element on which the phase of the received illumination light matches the light-receiving sensitivity of the laminated AMI image sensor 201. In contrast, only a small number of signal charges are stored in a picture element on which the phase of the received illumination light does not match the light-receiving sensitivity of the laminated AMI image sensor 201. In other words, the detection of the phase of the received illumination light is performed at each picture element. The amount of electric charge stored therein as the result of the detection represents range information concerning the three-dimensional object 208 directly. Incidentally, in FIG. 24, reference numeral 205 designates a signal processor for processing an image pickup signal sent from the image sensor 201.

Furthermore, in the case of the sensor of the present invention, the electric charge generated by the photons coming like DC components is integrated within a storing time period. However a total amount of the integrated charges becomes nearly to 0, because the sensitivity of the image sensor is modulated in an alternating current manner as above described. Thus, only the electric charge generated by the photons, which are caused by the illumination light from the modulated light source to impinge on each picture element of the image sensor, is stored therein. Therefore, this embodiment has a characteristic feature in that a signal, which has a preferable S/N and little offset, can be obtained. Moreover, in the case of this embodiment, the influence of the direct-current-like reflected light is canceled in the stage in which the electric charge is obtained by the photoelectric conversion. Thus, the optical band-pass filter 16, which is required by the first embodiment of FIG. 4, for eliminating the influence of incident light having a wavelength other than that of the illumination light coming from the light source becomes unnecessary. Consequently, the configuration of the optical system is simplified. This corresponds to the fact that the ideal condition that $k_1=0$ is realized in the equation (19) which is derived in the description of the second embodiment and gives the range information.

Figure 25:
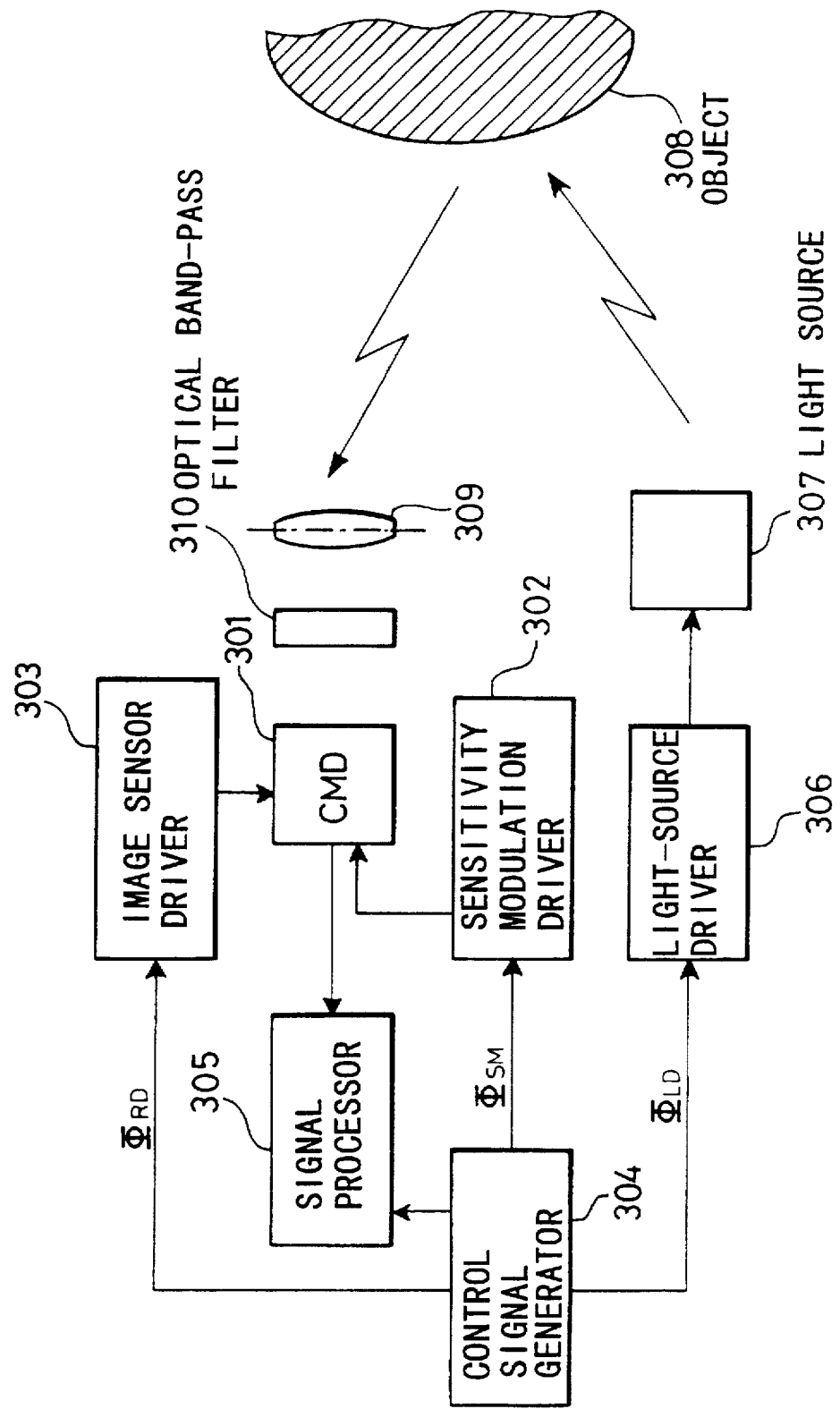
FIG. 25 is a block diagram for illustrating the entire configuration of a seventh embodiment of the present invention.
Figure 26:
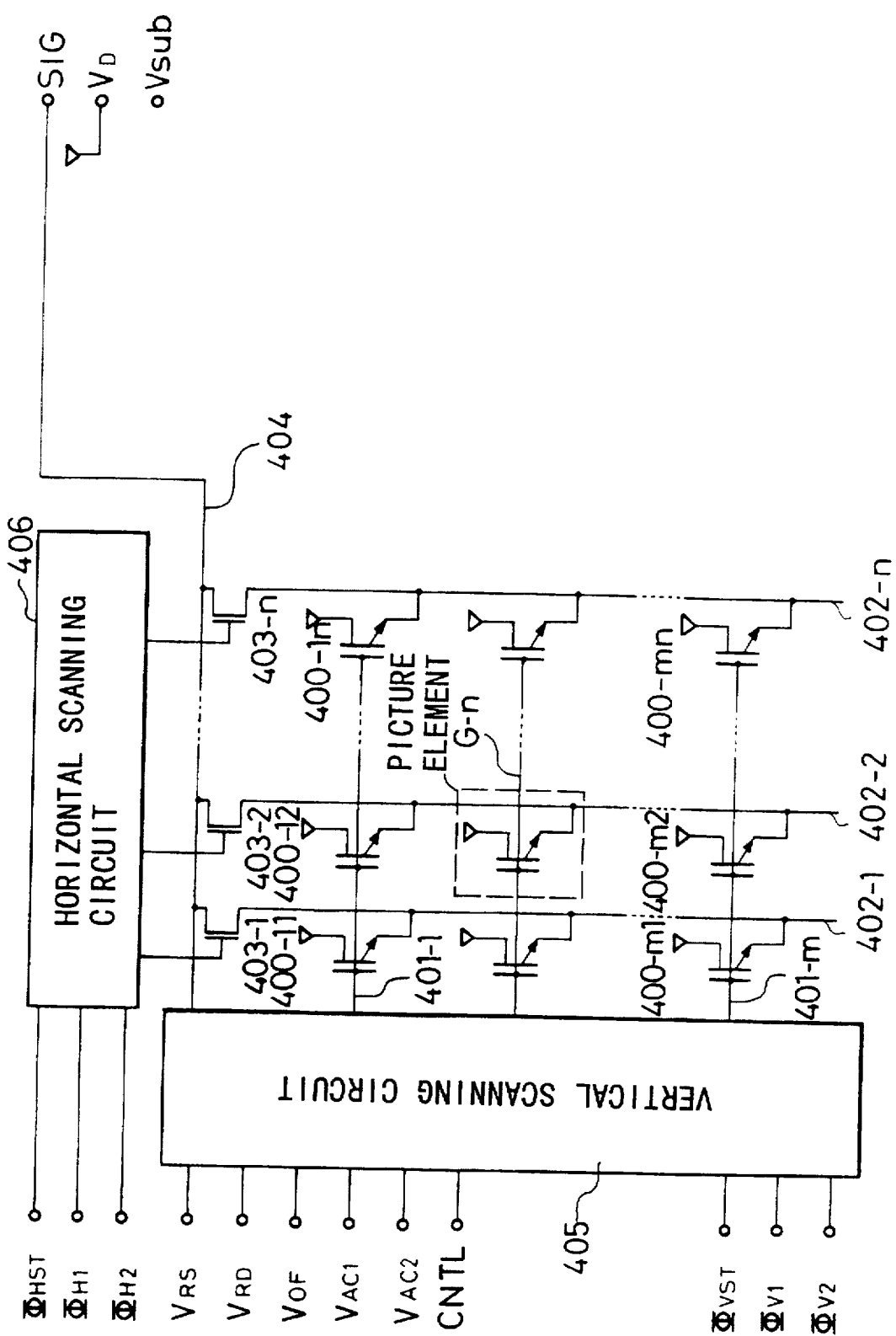
FIG. 26 is a circuit diagram for illustrating the entire configuration of a two-dimensional CMD image sensor used as a two-dimensional image sensor of the seventh embodiment of the present invention.

Next, a seventh embodiment of the present invention will be described with reference to FIG. 25. In this figure, reference numeral 301 designates a two-dimensional CMD image sensor; 302 a sensitivity modulation driver for modulating the sensitivity of the image sensor 301; 303 an image sensor driver; 304 a control signal generator; 305 a signal processor; 306 a light-source driver; 307 a light source; 308 an object; 309 an image-formation optical system; and 310 an optical band-pass filter for eliminating the influence of background light and for transmitting only light, whose wavelength is in the proximity of the wavelength of reflected light of the wavelength band of the light source 307 having undergone the luminance modulation FIG. 26 is a circuit diagram for illustrating the entire configuration of the two-dimensional CMD image sensor 301 that is a composing element of this embodiment of the present invention. This device is different in the vertical scanning circuit 405 from the two-dimensional CMD image sensor used in the second embodiment of FIG. 11. This circuit 405 has two terminals $V_{AC1}$ and $V_{AC2}$ for determining potential to be applied to each of the gate selecting lines 401-1, 401-2, ... 401-m within the exposure time. Potential to be applied to each of gate selecting lines is set at one of the terminals $V_{AC1}$ and $V_{AC2}$ according to signals supplied to a control terminal CNTL. Here, it is assumed for brevity of description that for example, the potential corresponding to the terminal $V_{AC1}$ is applied to the odd-numbered gate selecting lines and the potential corresponding to the terminal $V_{AC2}$ is applied to the even-numbered gate selecting lines. Incidentally, in FIG. 26, reference characters 400-11, 400-21, ... , 400-mn designate CMD picture elements; 402-1, 402-2, ... , 402-n designate column lines; 403-1, 403-2, ... , 403-n designate column selecting transistors; 404 a signal line; and 406 a horizontal scanning circuit.

Figure 27:
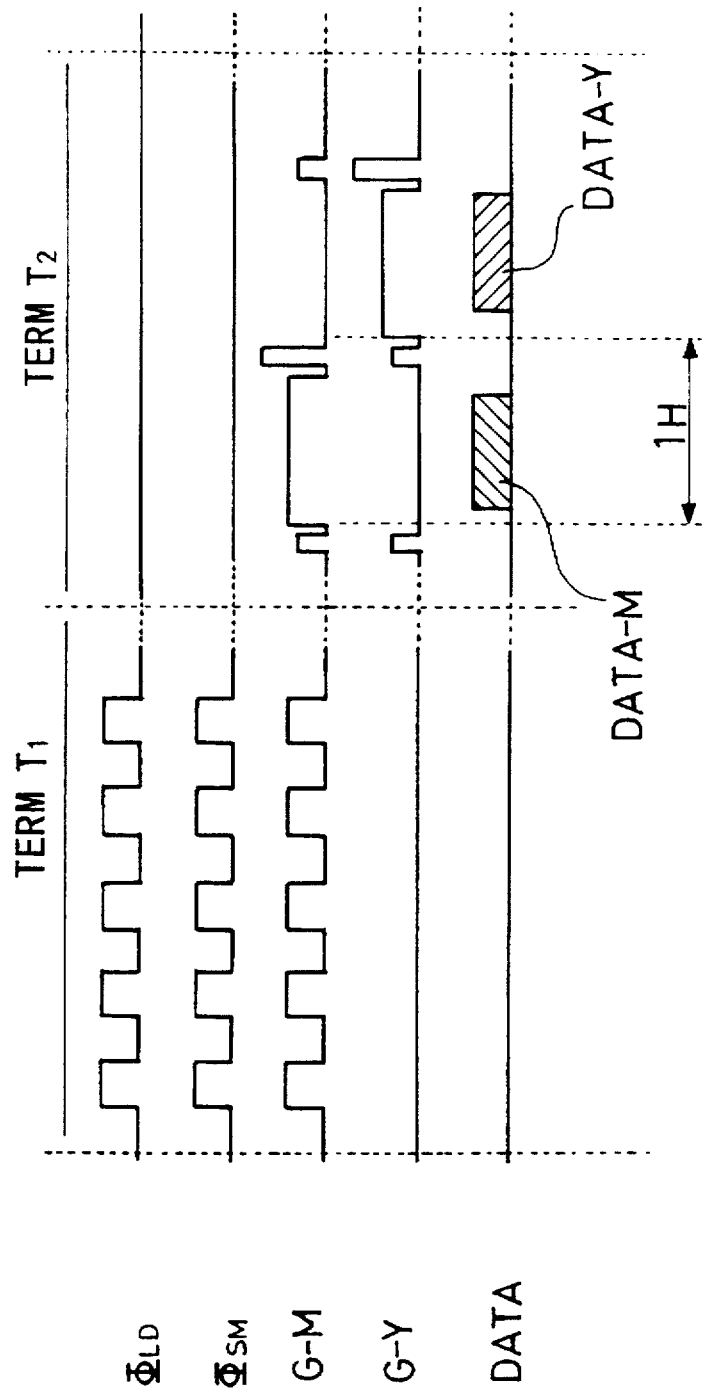
FIG. 27 is a timing chart for illustrating an operation of the seventh embodiment of the present invention.

Next, an operation of the two-dimensional rangefinding sensor using the CMD image sensor 301 having such a configuration will be described by referring to FIG. 27. In this figure, $\Phi_{LD}$ designates the waveform of a signal for driving the light source 307; and $\Phi_{SM}$ the waveform of a sensitivity modulation control signal. Further, it is assumed that a signal having the waveform for causing the sensitivity modulation is applied at the terminal $V_{AC1}$ of the CMD image sensor 301 in synchronization with the sensitivity modulation control signal $\Phi_{SM}$ and that a DC voltage signal having the waveform for causing the light receiving operation in a direct-current component manner is applied at the terminal $V_{AC2}$ thereof. Further, signals G-M and G-Y represent the potential of the gate selecting lines adjoining to each other. In the term $T_1$, the light source 307 starts the luminance modulation in response to the luminance modulation signal $\Phi_{LD}$. Then, the sensitivity modulation control signal $\Phi_{SM}$ is input to the sensitivity modulation driver 302 in synchronization with the signal $\Phi_{LD}$. Subsequently, the sensitivity modulation driver 302 modulates the sensitivity of the picture elements connected to the odd-numbered gate selecting lines of the CMD image sensor 301. The signal G-M represents the potential of the odd-numbered gate selecting lines. Further, for the term $T_1$, the potential is modulated in order to realize the sensitivity modulation during the light receiving operation.

On the other hand, the signal G-Y represents the potential of the even-numbered gate selecting lines. Furthermore, a DC voltage is applied thereto in order to cause the picture element to perform the normal direct-current-component-like light receiving operation when receiving light. In FIG. 27, reference characters DATA represent data to be read from the CMD image sensor 301 for the term $T_2$; and DATA-M data corresponding to the sensitivity modulation light-receiving operation. On the other hand, the data represented by the signal DATA-Y corresponding to the even-numbered gate selecting lines are data corresponding to the ordinary direct-current-component-like light receiving operation.

Here, data $H_1$ (DATA-M), which corresponds to the sensitivity modulation, and data $H_2$ (DATA-Y), which corresponds to the ordinary luminance in the case that the sensitivity modulation is not conducted, are obtained as data for adjacent picture elements arranged upwardly (or downwardly), on which the image of almost the same point on the object is formed, of the CMD image sensor 301. These data are given by the following equations (28) and (29) correspondingly to the aforementioned equations (17) and (18), respectively.

$$H_1 = T_1 \cdot [I(x,y) \cdot \{k_1 + k_2 \cdot f(z)\} + h_2] \qquad (28)$$

$$H_1 = T_1 \cdot [I(x,y) \cdot \{k_1 + k_2 \cdot 1\} + h_2] \qquad (29)$$

Thus, the range information is obtained by the following equation (30) correspondingly to the equation (19).

$$f(z) = (H_1 - h_2 \cdot T_1)/(H_2 - h_2 \cdot T_1) \cdot (1 + k_1/k_2) - k_1/k_2 \qquad (30)$$

In the case of the aforesaid examples (typically, the second embodiment), an image pickup operation in the sensitivity modulation mode and another image pickup operation in the luminance modulation mode should be performed, namely, the image pickup operations should be performed two times. In contrast, in the case of the seventh embodiment, the sensor is provided with a single two-dimensional CMD image sensor in which picture elements, each of which is operative to perform an image pickup operation in an ordinary direct-current-component-mode-like luminance mode, and picture elements, each of which is operative to perform an image pickup operation in a sensitivity modulation mode, are disposed in an intermixed manner. Thereby, both of a modulation-mode image pickup and a luminance-mode image pickup can be simultaneously performed in a single image pickup operation to thereby obtain two-dimensional range information in a short period of time in comparison with the aforementioned examples (typically, the second embodiment).

Figure 28:
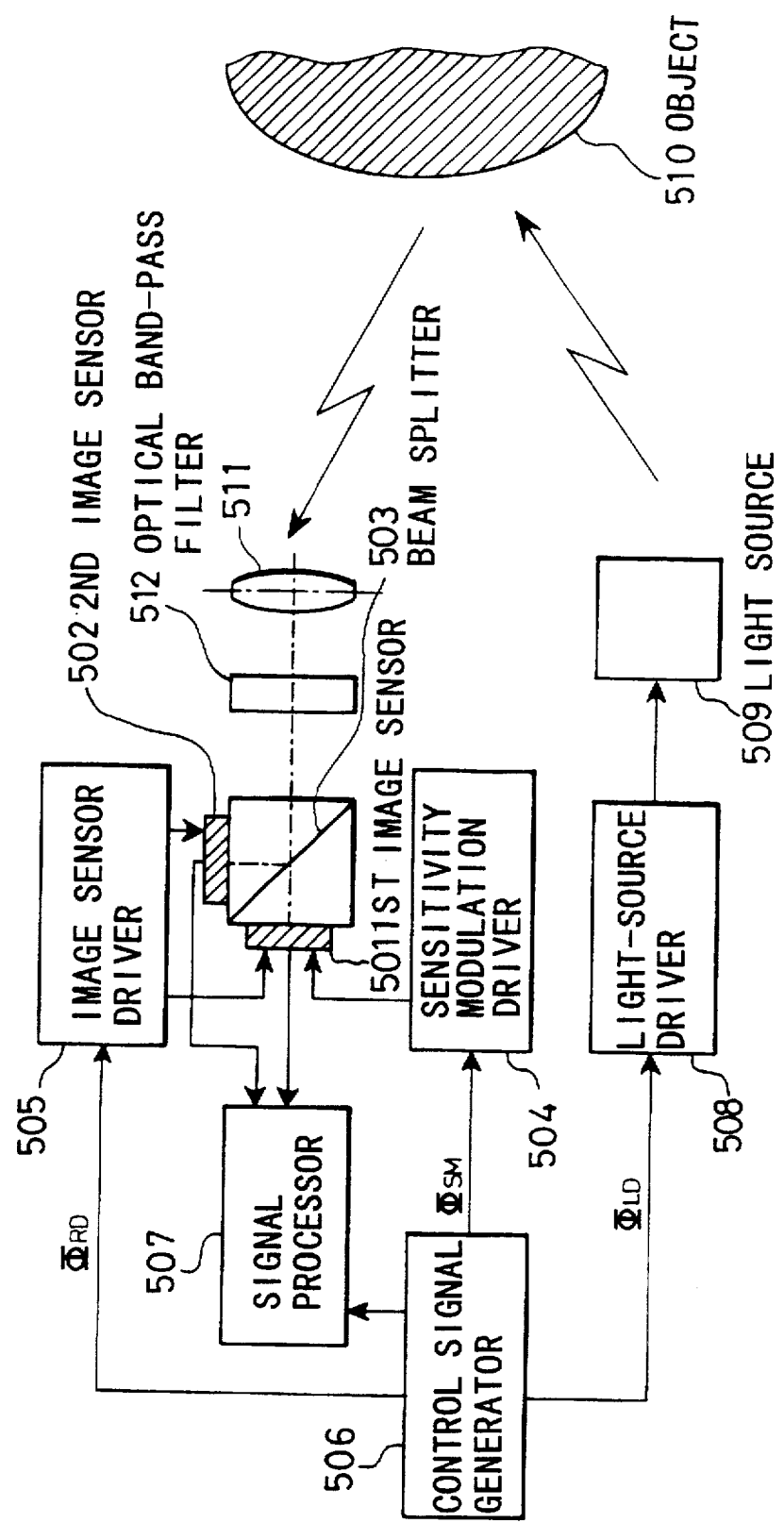
FIG. 28 is a block diagram for illustrating the entire configuration of an eighth embodiment of the present invention.

Next, an eighth embodiment of the present invention will be described hereinafter with reference to FIG. 28. In this figure, reference numeral 501 designates a first two-dimensional image sensor; 502 a second two-dimensional image sensor; and 503 a beam splitter constituted by a semi-transparent mirror or a prism or the like. The first and second image sensor 501 and 502 are disposed at places on the emission surface of the beam splitter 503, which are optically equivalent places. Moreover, reference numeral 504 designates a sensitivity modulation driver for modulating the sensitivity of the first image sensor 501; 505 an image sensor driver; 506 a control signal generator; 507 a signal processor; 508 a light-source driver; 509 a light source; 510 an object; 511 an image-formation optical system; and 512 an optical band-pass filter for eliminating the influence of background light and for transmitting only light, whose wavelength is in the proximity of the wavelength of reflected light of the wavelength band of the light source 509 having undergone the luminance modulation.

Figure 29:
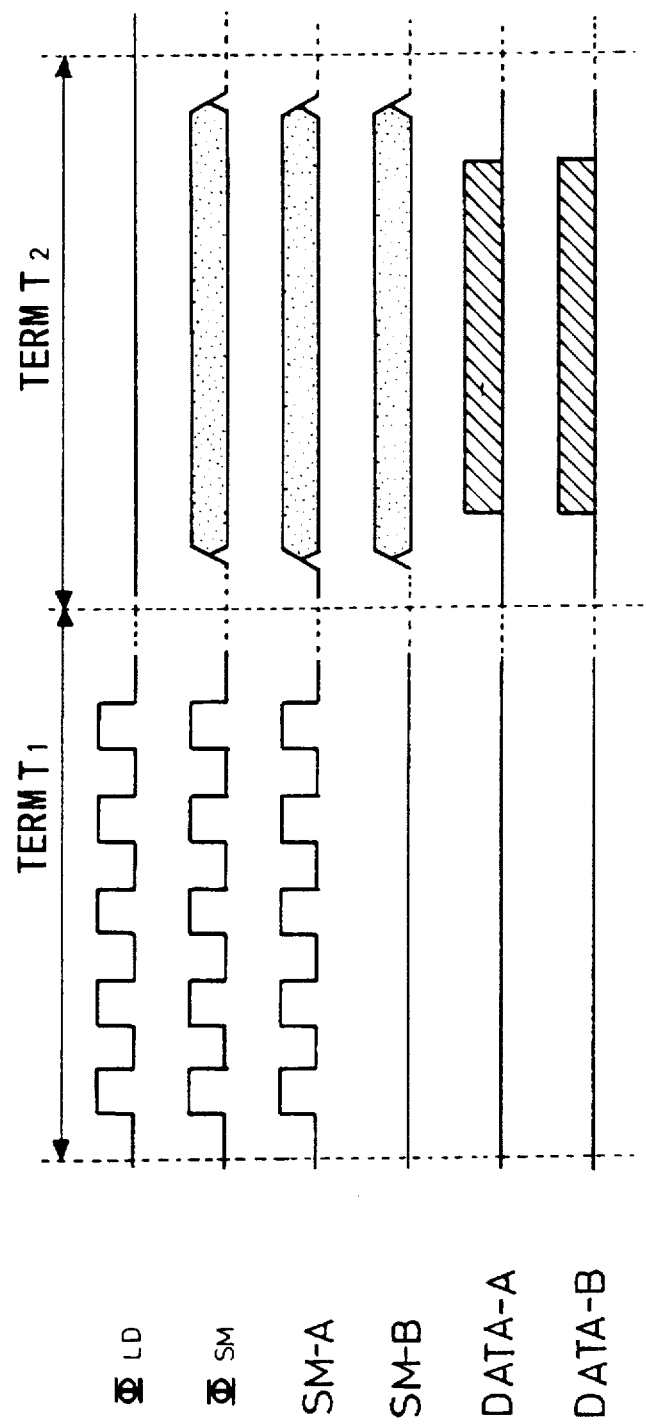
FIG. 29 is a timing chart for illustrating an operation of the eighth embodiment of the present invention.

Next, an operation of the two-dimensional rangefinding sensor having this configuration will be described hereunder by referring to FIG. 29. In this figure, $\Phi_{LD}$ designates the waveform of a signal for driving the light source 509; SM-A the waveform of a signal for modulating the sensitivity of the first image sensor 501; and SM-B the waveform of a signal for modulating the sensitivity of the second image sensor 502. However, in the case of this embodiment, the sensitivity of the second image sensor 502 is not modulated but is performed in the ordinary image pickup mode. Further, reference characters DATA-A and DATA-B represent data to be read from the first image sensor 501 and data to be read from the second image sensor 502, respectively. In the term $T_1$, the light source 509 starts the luminance modulation in response to the luminance modulation signal $\Phi_{LD}$. Then, the sensitivity modulation control signal $\Phi_{SM}$ is input to the sensitivity modulation driver 504 in synchronization with the signal $\Phi_{LD}$. Subsequently, the sensitivity modulation driver 504 modulates the sensitivity of the first image sensor 501. On the other hand, the sensitivity of the second image sensor 502 is not modulated but is operated in the ordinary image pickup mode. In the term $T_2$, the illumination by means of the light source 509 is stopped. Moreover, the first image sensor 501 and the second image sensor 502 are driven in order to read the data, respectively, and furthermore, output the corresponding data DATA-A and DATA-B, respectively.

Here, these data are given by the following equations (31) and (32) correspondingly to the aforementioned equations (17) and (18), respectively.

$$H_1 = T_1 \cdot [I(x,y) \cdot \{k_1 + k_2 \cdot f(z)\} + h_2] \qquad (31)$$

$$H_1 = T_1 \cdot [I(x,y) \cdot \{k_1 + k_2 \cdot 1\} + h_2] \qquad (32)$$

Thus, the range information is obtained by the following equation (33) correspondingly to the equation (19).

$$f(z) = (H_1 - h_2 \cdot T_1)/(H_2 - h_2 \cdot T_1) \cdot (1 + k_1/k_2) - k_1/k_2 \qquad (33)$$

In the case of the aforesaid examples (typically, the second embodiment), an image pickup operation in the sensitivity modulation mode and another image pickup operation in the luminance modulation mode should be performed, namely, the image pickup operations should be performed two times. In contrast, in the case of the eighth embodiment, light beams obtained by splitting (the optical path of) the light coming from the object by means of the beam splitter are sent to the two image sensors. Moreover, two images are formed onto the two image sensors simultaneously. Thereby, both of a modulation-mode image pickup and a luminance-mode image pickup can be simultaneously performed in a single image pickup operation to thereby obtain two-dimensional range information in a short period of time in comparison with the aforementioned examples (typically, the second embodiment). Furthermore, in the case of the aforementioned seventh embodiment of the present invention, the picture elements of a single two-dimensional image sensor are divided into a group of the picture elements for the sensitivity modulation mode and another group of the picture elements for the luminance modulation mode. Thus, the spacial resolving power of the seventh embodiment becomes half of that of the examples previously described (typically, the second embodiment). In addition, the seventh embodiment has an evil effect of using the data obtained at adjoining positions, which are different from each other in the strict sense, for the calculation of the range information. In the case of the eighth embodiment, a two-dimensional rangefinding sensor, which resolves such problems, can be provided.

As above described in the foregoing description of the embodiments, in accordance with the present invention, the sensitivity of the two-dimensional image sensor is modulated in synchronization with the luminance modulation frequency of the illumination light. Thus, the distribution of the signal charge on the two-dimensional image sensor corresponding to the two-dimensional range information, in other words, the range(-data) image corresponding thereto can be directly obtained without mechanical scanning with illumination light.

Although the preferred embodiments of the present invention have been described above, it should be understood that the present invention is not limited thereto and that other modifications will be apparent to those skilled in the art without departing from the spirit of the invention. The scope of the present invention, therefore, should be determined solely by the appended claims.

What is claimed is:

1. A two-dimensional rangefinding sensor, comprising:
    an illuminating device for projecting light beams which undergoes luminance modulation at a predetermined frequency for a predetermined duration with a predetermined cycle time, onto an object;
    an image-formation optical system for forming an image of the object illuminated with light beams which have undergone the luminance modulation and have been projected from the illuminating device;
    a two-dimensional image sensor mounted on an image-formation plane of the image-formation optical system,
    said two-dimensional image sensor including an electrode terminal for applying a signal for controlling the sensitivity of said two-dimensional image sensor;
    a driving means for performing a modulation driving operation on the electrode terminal of the two-dimensional image sensor at said predetermined frequency; and
    a reading means for extracting a signal corresponding to a signal charge generated in each of picture elements of the two-dimensional image sensor.

2. The two-dimensional rangefinding sensor according to claim 1, wherein the two-dimensional image sensor comprises a CMD image sensor and further uses one of a gate electrode and a substrate electrode of the CMD image sensor as an electrode terminal for modulation of the sensitivity.

3. The two-dimensional rangefinding sensor according to claim 2, wherein the two-dimensional CMD image sensor comprises a p--channel layer and an n⁻-channel layer that are formed on a p-type substrate of a CMD image sensor by performing an epitaxial growth method, wherein an impurity concentration of the p-type substrate is set in such a way as to be greater than an impurity concentration of the p⁻-channel layer.

4. The two-dimensional rangefinding sensor according to claim 2, wherein the two-dimensional CMD image sensor including a thin substrate having a back surface portion is partially removed by lapping.

5. The two-dimensional rangefinding sensor according to claim 1, wherein the two-dimensional image sensor comprises a cooling unit provided in a back surface portion thereof.

6. The two-dimensional rangefinding sensor according to claim 1, wherein the two-dimensional image sensor comprises an electron-bombarded AMI image sensor and uses an electron-accelerating voltage application terminal of the AMI image sensor as an electrode terminal for modulation of the sensitivity.

7. The two-dimensional rangefinding sensor according to claim 1, wherein the two-dimensional image sensor comprises a laminated two-dimensional AMI image sensor and uses a transparent electrode terminal of the AMI image sensor as an electrode terminal for modulation of the sensitivity.

8. A two-dimensional rangefinding sensor, comprising:
    an illuminating device for projecting light beams which undergoes luminance modulation at a predetermined frequency for a predetermined duration with a predetermined cycle time, onto an object;
    an image-formation optical system for forming an image of the object illuminated with light beams which have undergone the luminance modulation and have been projected from the illuminating device;
    first and second two-dimensional image sensors for receiving a light beam representing an image of an object;
    a beam splitter for splitting an image-formation light beam obtained through image-formation optical system into light beams to be respectively sent to the first and second two-dimensional image sensors;
    a driving means for performing a modulation driving operation on an electrode terminal, which is operative to determine sensitivity of the first two-dimensional image sensor, at said predetermined frequency; and
    a reading means for taking out a signal corresponding to a signal charge generated by each of picture elements of the first and second two-dimensional image sensors.

9. A two-dimensional rangefinding sensor, comprising:
    an illuminating device for projecting light beams, which undergoes luminance modulation at a predetermined frequency for predetermined duration with a predetermined cycle time, onto an object;
    an image-formation optical system for forming an image of the object illuminated with light beams which have undergone the luminance modulation and have been projected from the illuminating device;
    a two-dimensional CMD image sensor mounted on an image-formation plane of the image-formation optical system;
    a driving means for performing a modulation driving operation on a gate electrode terminal corresponding to each of a part of picture elements of the two-dimensional CMD image sensor at the frequency, among gate electrode terminals, which are operative to determine sensitivity of the picture elements of the two-dimensional CMD image sensor; and
    a reading means for taking out a signal corresponding to a signal charge generated by each of the picture elements of the two-dimensional CMD image sensor.

* * * * *